United States Patent [19]
Jones

[11] Patent Number: 5,691,822
[45] Date of Patent: Nov. 25, 1997

[54] RAPID VARIABLE ANGLE ELECTRONIC HALFTONE SCREENING USING UNROTATED THRESHOLD MATRICES

[76] Inventor: Peter R. Jones, 138 Hawthorne Ave., Larkspur, Calif. 94939

[21] Appl. No.: 371,080

[22] Filed: Jan. 10, 1995

[51] Int. Cl.⁶ ................ H04N 1/40; H04N 1/46
[52] U.S. Cl. ........................... 358/454; 358/460
[58] Field of Search ...................... 358/533–536, 358/454, 459–460, 456, 298

[56] References Cited

U.S. PATENT DOCUMENTS

| | | | |
|---|---|---|---|
| 5,274,473 | 12/1993 | Kidd et al. | 358/460 |
| 5,315,407 | 5/1994 | Sakamoto et al. | 358/460 |
| 5,381,247 | 1/1995 | Hains | 358/536 |
| 5,463,471 | 10/1995 | Chou | 358/533 |

Primary Examiner—Edward L. Coles, Sr.
Assistant Examiner—Stephen Brinich
Attorney, Agent, or Firm—Townsend and Townsend and Crew LLP

[57] ABSTRACT

In halftone imaging using rotated halftone dot cells, the determination of correspondences between microdots and threshold matrix cells is simplified by leaving the threshold matrices which overlie each halftone dot cell unrotated. Threshold decisions for each microdot in a given horizontal row of a grid proceed in sequence. Each increment along a microdot row within a halftone cell is a unit increment along a horizontal axis of the threshold matrix. Hence, within each halftone cell, two integer additions are sufficient to derive an address of the threshold matrix cell associated with a microdot given the address of the threshold matrix cell associated with the previous microdot.

15 Claims, 12 Drawing Sheets

ANGLE, θ = 15°
EXTENT = 6.00
COS(θ) = 0.258819045102520739
SIN(θ) = 0.965925826289068312
MAJOR = EXTENT × COS(θ) = 5.7955549577344101
MINOR = EXTENT × SIN(θ) = 1.55291427061512444

ANGLE θ = 15°
CU = 1/3; CV = 1/2
U COUNT = 24; V COUNT = 16
U EXTENT = V EXTENT = 8

RAPID VARIABLE ANGLE ELECTRONIC HALFTONE SCREENING USING UNROTATED THRESHOLD MATRICES

BACKGROUND OF THE INVENTION

This invention relates to image reproduction by electronic halftoning, and, in particular to image production using halftone screens which may be oriented at arbitrary angles with respect to an underlying grid of microdots of a display medium.

There is a well-known process of reproducing a full color image on a display medium by a halftone representation. The process consists of two stages: first, reduction of the full-color image to a set of separations in a limited number of inks to produce a continuous tone image or "contone image"; second, representation of the variable image intensities in each separation as halftone dots of various size rendered in a single ink.

In a so-called continuous tone image or "contone image", it is typical to represent the image by three chromatic separations, in cyan, magenta and yellow inks, plus one separation in black ink. These four colors are commonly denoted by the letters C, M, Y and K. (The "K" used to denote the black separations stands for "Key.") Numerical values of C,M,Y and K at each of a number of points or microdots represent the image to be rendered. Numerous microdots are arranged on the display medium in a regular square grid at a high resolution; say, for example, a grid of 2400 points per inch. Each such microdot has for each separation an associated signal value in some preselected range, say the range of 256 integers between 0 and 255 inclusive. For a paper display medium, the signal value for a given separation and microdot represents the concentration of ink associated with the given separation at the location occupied by the given microdot.

Direct representation of continuous tone images on paper is impractical because actual printing presses are capable only of applying or not applying a single concentration of ink to a given microdot. Therefore, the concentration of ink must be modulated not by varying the thickness of the ink as envisioned by continuous tone techniques but rather by varying the area over which the ink is applied.

Halftoning techniques addresses this problem by drawing halftone dots of variable size on a coarser grid than the one occupied by the microdots. The information to be conveyed by the variable levels of concentration of the inks at a very fine resolution is conveyed instead by the same number of levels of sizes of halftone dots drawn on a coarser grid. A halftoning system draws a halftone dot to be a desired size by marking a variable number of adjacent microdots.

FIG. 1 depicts a so-called thresholding technique for constructing halftone images as applied to one horizontal line or raster of microdots from one separation of an image. In FIG. 1, a horizontal line 2 represents a line or raster within the image. Horizontal line 2 passes through a plurality of microdots 4. The region traversed by horizontal line 2 is divided into halftone dot cells 6 which each encompass eight microdots. Gently rising line 8 illustrates the ideal contone ink intensities at each microdot, or the "signal function." Regular, periodic, notched, sawtooth line 10 denotes a set of threshold values, with one threshold value associated with each microdot. Any particular instantiation of such a regular periodic function used for thresholding may be referred to as a "screen function" or "spot function" or "threshold function." The period of the function, measured in microdots, is the "screen period" or the "width of a halftone dot cell."

Halftoning by thresholding uses a decision criterion based on comparison of the signal value at a microdot (the ideal ink concentration at the microdot) to the threshold value at the microdot to decide whether or not to mark or consisting of four of the cells 906, 908, 910, and 912, is shown. Superimposed on each halftone cell is a threshold matrix of 36 matrix cells 314.

Each halftone grid threshold matrix, includes six rows, r0, r1, . . . , r5 and six columns c0, c1, . . . , c5. Thus the location of a cell within a halftone grid matrix can be identified by the row and column pair; e.g., (r0, c0) identifies the top left cell of any halftone grid cell.

In order to determine whether a given microdot should be marked or left unmarked, a corresponding threshold matrix cell must be identified. Where the halftone cells are not rotated relative to the microdot grid, this does not present a problem because there is a simple one-to-one correspondence between microdot cells and threshold matrix cells. However, in the situation depicted in FIG. 3, identifying correspondences between microdots and threshold matrix cells requires a computation-intensive transformation between the u-v and x-y coordinate systems. In color printing applications, these calculations must be performed in real-time.

Various techniques have been developed for minimizing the computations required to identify correspondences but all of them require that one or more floating-point calculations be repeated. What is needed is a computationally efficient technique for determining the threshold value associated with a given microdot where halftone cells are rotated relative to a microdot grid.

SUMMARY OF THE INVENTION

In accordance with the invention, in halftone imaging using rotated halftone dot cells, the determination of correspondences between microdots and threshold matrix cells is simplified by leaving the threshold matrices which overlie each halftone dot cell unrotated. Threshold decisions for each microdot in a given horizontal row of a grid proceed in sequence. Each increment along a microdot row within a halftone cell is a unit increment along a horizontal axis of the threshold matrix. Hence, within each halftone cell, two color the microdot. For example, the decision criterion might be that a microdot is colored if and only if the signal value at the center of the microdot exceeds the threshold value at the center of the microdot. In FIG. 1, the microdots which meet this criterion are colored in black.

FIG. 2 depicts a screen function for the microdots of a single eight-by-eight halftone cell of an image. Each microdot is shown as having an associated discrete threshold value. As shown, the values reach a trough near the center. If the screen function were to be depicted in two dimensions over many half tone cells, it would appear as an oscillatory "eggcrate" function.

FIG. 2 assumes that an image is tiled with vertically oriented halftone cells threshold matrices, so that each microdot corresponds to one and only one cell of a threshold matrix. The two-dimensional screen function, the function which assigned threshold values to microdots, can then be evaluated by the simple procedure of referencing, at each microdot, the unique threshold value corresponding to the microdot.

However, in real applications it is often necessary to rotate the halftone cells with respect to the grid of microdots. This rotation is required to correct visual artifacts which result from misregistration of the various layers of microdots corresponding to different colors, the so-called "moire" effect. Complications arise, however, because threshold values can no longer be assigned simply to microdots.

FIG. 3 illustrates problems presented when assigning threshold values to microdots where halfdot cells are rotated relative to the microdot grid. A u-v coordinate system is aligned with the microdot grid 900. Superimposed on the microdot system in FIG. 3, and rotated at an angle of fifteen degrees, is a halftone screen grid 302, consisting of halftone cells with width equal to six microdots. The halftone cells are aligned with an x-y coordinate system, rotated fifteen degrees with respect to the u-v coordinate system of the microdot grid 900. A portion of this halftone grid, integer additions are sufficient to derive an address of the threshold matrix cell associated with a microdot given the address of the threshold matrix cell associated with the previous microdot.

In accordance with the invention, special techniques are used when a succeeding microdot in a row lies in a new halftone cell. To determine when a new halftone cell is entered, the technique of the invention monitors the horizontal distance to a boundary line to the right of the current position. When processing of a new microdot causes the distance to the nearest boundary line to change sign, a new halftone cell has been entered. An efficient transformation then determines the corresponding threshold matrix cell within the new halftone cell.

The invention and advantages thereof will be better understood with reference to the accompanying drawings and detailed description.

DESCRIPTION OF SPECIFIC EMBODIMENTS

Figures 1, 2:
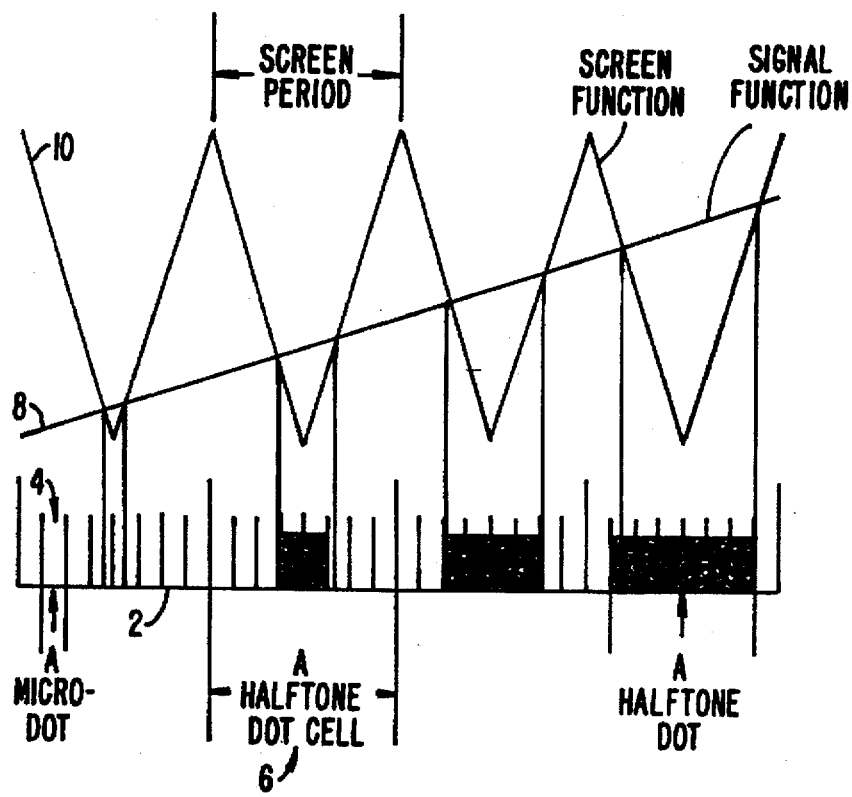
FIG. 1 depicts the so-called thresholding technique for constructing halftone images as applied to one horizontal line or raster of microdots from one separation of an image.
FIG. 2 depicts the screen function for the microdots of a single eight-by-eight halftone cell.
Figure 3:
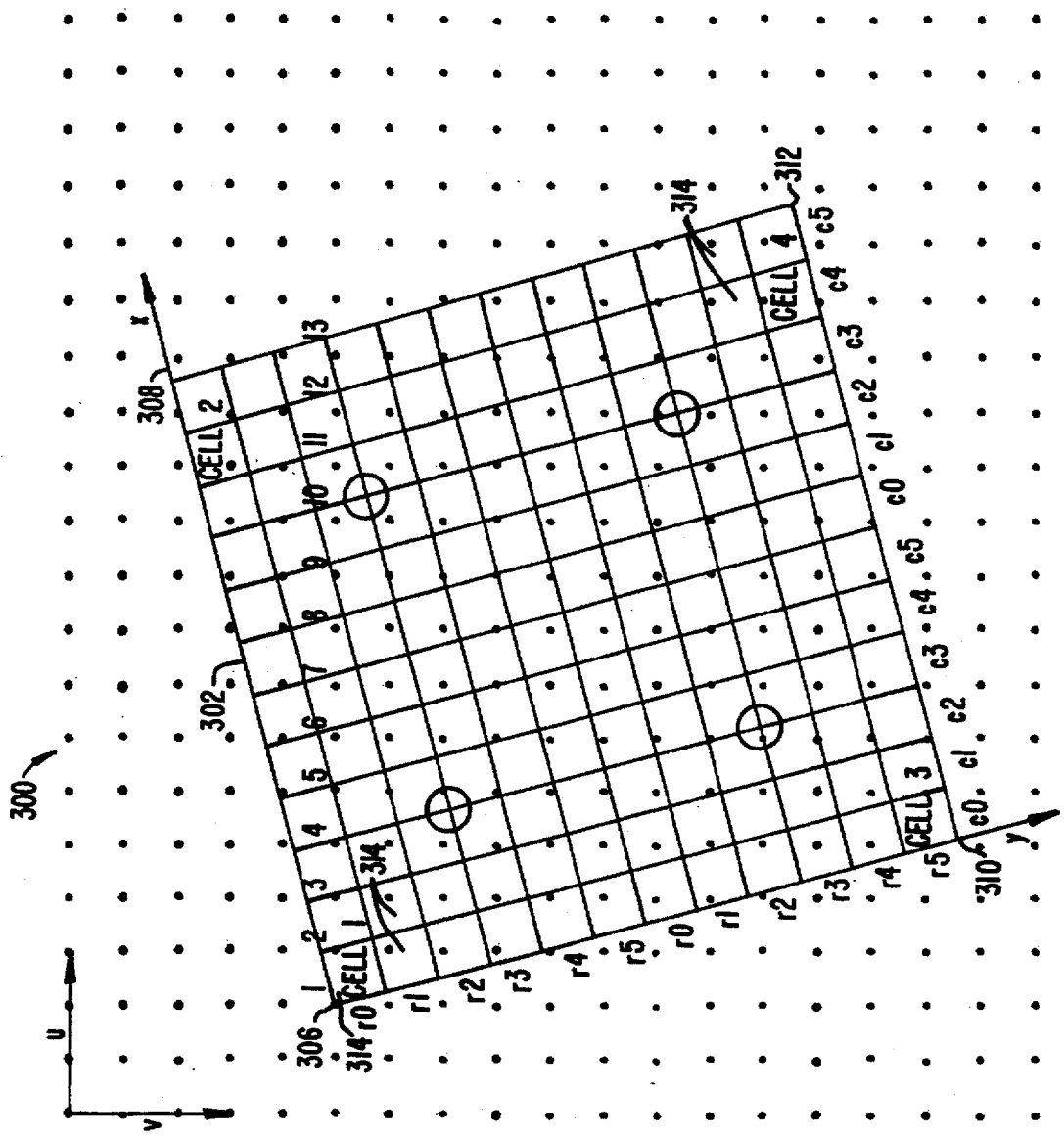
FIG. 3 depicts halftoning with rotated threshold matrices.
Figure 4:
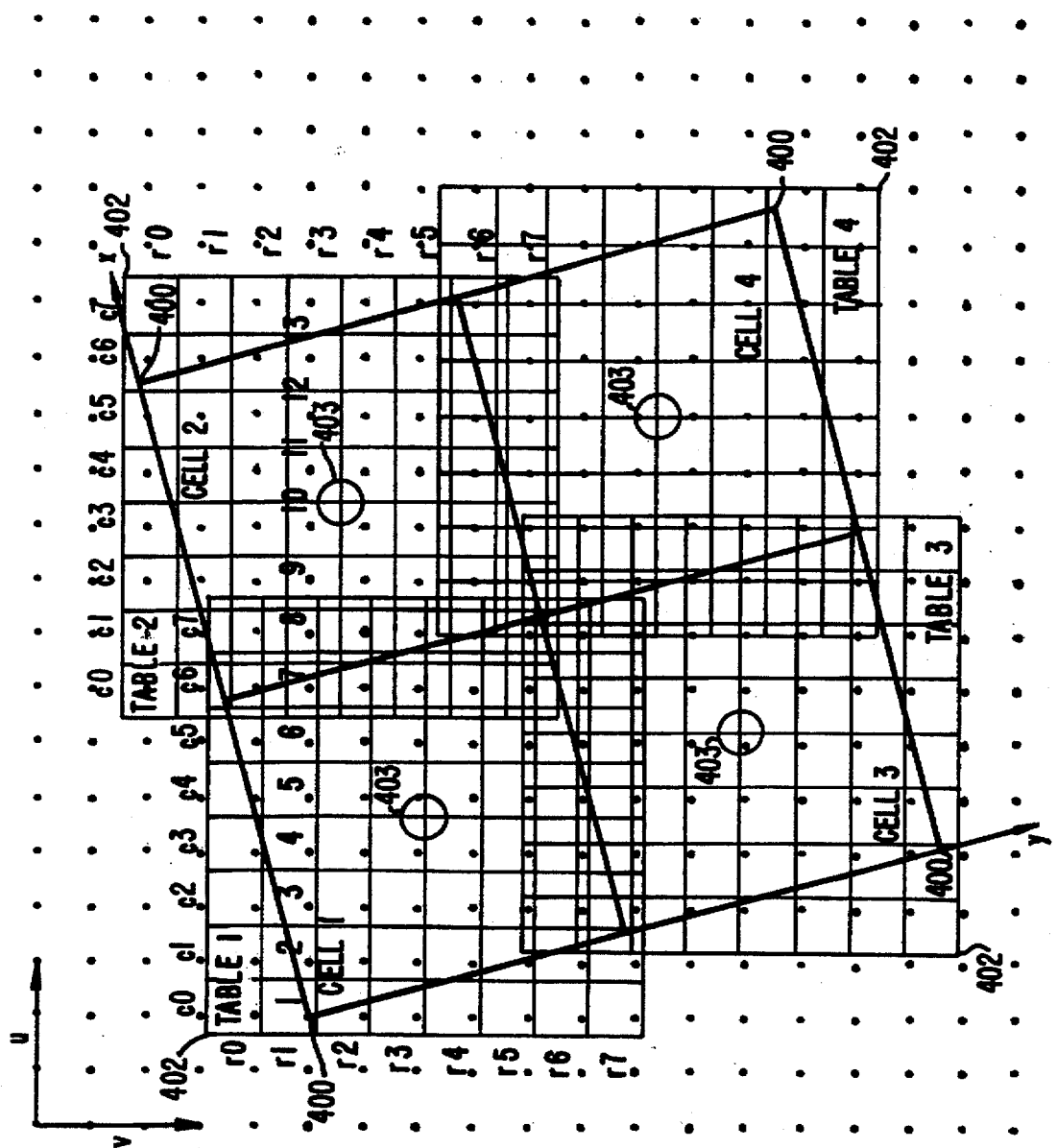
FIG. 4 depicts halftoning with unrotated threshold matrices in accordance with the invention.

FIG. 4 depicts halftoning with unrotated threshold matrices in accordance with a preferred embodiment of the present invention. Each halftone dot cell 400 in FIG. 4 is surrounded by a larger unrotated threshold matrix or table 402 centered on the center of the halftone dot cell 400. Thus cell 1 is surrounded by matrix 1, cell 2 is surrounded by matrix 2 and so on. In FIG. 4, the threshold matrices 402 are of dimension 8 by 8 (measured in microdot space or (u-v) space units), whereas the underlying halftone dot cells 1000 are of dimension 6 by 6.

Because the threshold matrices 402 in FIG. 4 (which are parallel to the u-v axis) are oriented at an angle to the halftone dot grid (which is parallel to the x-y axis), individual threshold element cells 404 which constitute the halftone threshold matrix 402 do not exactly cover the halftone dot cell 400 on which it is centered. Some threshold element cells 404 are completely within the associated halftone dot cell. Some threshold element cells 404 are completely outside of the associated halftone dot cell. Some threshold element cells 404 are partially within and partially outside of the associated halftone dot cell 400.

The exact inclusion-exclusion status of the individual threshold element cells in FIG. 4 is given in Table 1 below.

TABLE 1

Status of Threshold Element Cells in FIG. 4
("area" is an abbreviation for "effective threshold cell area.")

| Cells wholly within the halftone dot cell | Cells partly within and partly outside the halftone dot cell | Cells wholly outside the halftone dot cell |
| --- | --- | --- |
| Cell area = 1.00 | 0.00 < Cell area < 1.00 | Cell area = 0.00 |
| r1c4, r4c6, r6c3, r3c1 r1c5, r5c6, r6c2, r2c1 r2c2, r2c5, r5c5, r5c2 r2c3, r3c5, r5c4, r4c2 r2c4, r4c5, r5c3, r3c2 r3c3, r3c4, r4c4, r4c3 | r0c3, r3c7, r7c4, r4c0 r0c4, r4c7, r7c3, r3c0 r0c5, r5c7, r7c2, r2c0 r0c6, r6c7, r7c1, r1c0 r1c1, r1c6, r6c6, r6c1 r1c2, r2c6, r6c5, r5c1 r1c3, r3c6, r6c4, r4c1 | r0c0, r0c7, r7c7, r7c0 r0c1, r1c7, r7c6, r6c0 r0c2, r2c7, r7c5, r5c0 |

The area of the intersection of a threshold element cell 404 with its associated halftone dot cell 400 is herein referred to as "the effective threshold cell area." As in the prior art, the probability of a microdot falling within any one threshold element cell 404 is proportional to the effective threshold cell area. However, in accordance with the invention, all threshold cells do not have identical effective areas.

Threshold tables must be designed for each screen angle in accordance with prior art criteria and techniques taking into account the fact that all threshold cells 404 do not have identical effective areas.

In accordance with the invention, special techniques are used to determine correspondences between microdot locations and threshold table addresses once threshold tables have been created. Examples of these techniques are fully described below.

Table 2, below, shows the progression of threshold table row and column address as the horizontal sequence of microdots, points 1 through 13, in FIG. 4 is traversed. The column addresses increment by one after each microdot, except on the halftone dot cell boundary crossed between microdots 7 and 8.

TABLE 2

| Microdot | threshold element cell | halftone dot cell (and threshold table) |
|---|---|---|
| 1 | (r1, c0) | 1 |
| 2 | (r1, c1) | 1 |
| 3 | (r1, c2) | 1 |
| 4 | (r1, c3) | 1 |
| 5 | (r1, c4) | 1 |
| 6 | (r1, c5) | 1 |
| 7 | (r1, c6) | 1 |
| 8 | (r3, c0) | 2 |
| 9 | (r3, c1) | 2 |
| 10 | (r3, c2) | 2 |
| 11 | (r3, c3) | 2 |
| 12 | (r3, c4) | 2 |
| 13 | (r3, c5) | 2 |

Special computations are required when one halftone dot cell is exited and an adjacent one is entered. In FIG. 4, this happens when moving from microdot 7, which is in row 1 and column 6 of the top left halftone dot cell, to microdot 8, which is in row 2 and column 0 of the top right halftone dot cell. This transition between halftone dot cells presents two problems:

(A) It is necessary to know when a halftone dot cell boundary has been traversed.

(B) When a halftone dot cell boundary is traversed, it is necessary to know the current location with respect to the new halftone dot cell; i.e., it is necessary to transform to the u-v coordinate system of the newly entered halftone cell.

The present invention allows rapid calculation of solutions to (A) and (B). The preferred embodiment solves problem (A), discerning the halftone cell within which a microdot lies, by keeping track of the horizontal distance to the halftone cell boundary lines to the right of the current position. When one of these distance values becomes negative, the preferred embodiment recognizes that a new halftone cell has been entered.

The solution to problem (B) will now be described. Successive pairs of halftone dot cells in the halftone grid have coordinate systems which are related to each other in a fixed manner. It can be assumed without loss of generality that the angle of rotation of the halftone dot grid with respect to the microdot grid is within the range of angles from 0 degrees to 45 degrees inclusive. (This assumption can be made because, since the halftone dot grid is a square lattice, a counterclockwise rotation angle of x degrees is equivalent to a clockwise rotation angle of x–45 degrees; so, for example, a counterclockwise rotation angle of 60 degrees is equivalent to a clockwise rotation angle of 15 degrees.) It can also be assumed without loss of generality, that the angle of rotation of the halftone dot grid with respect to the microdot grid is counter-clockwise, as in FIG. 4. (This can be assumed without loss of generality since the case of clockwise angles can be easily handled, because of some symmetry properties of the halftone address calculations, by code similar to that which handles the case of counterclockwise angles.) Let the rotation angle (counterclockwise in the range 0 to 45 degrees) be denoted by $\Theta$. Let the extent of the halftone dot cell, measured in units of the microdot space, be denoted by "extent". Next, define:

(1) major=extent*cos ($\Theta$);

(2) minor=extent*sin ($\Theta$); and (3) square=(major–minor)/2.

Figure 5:
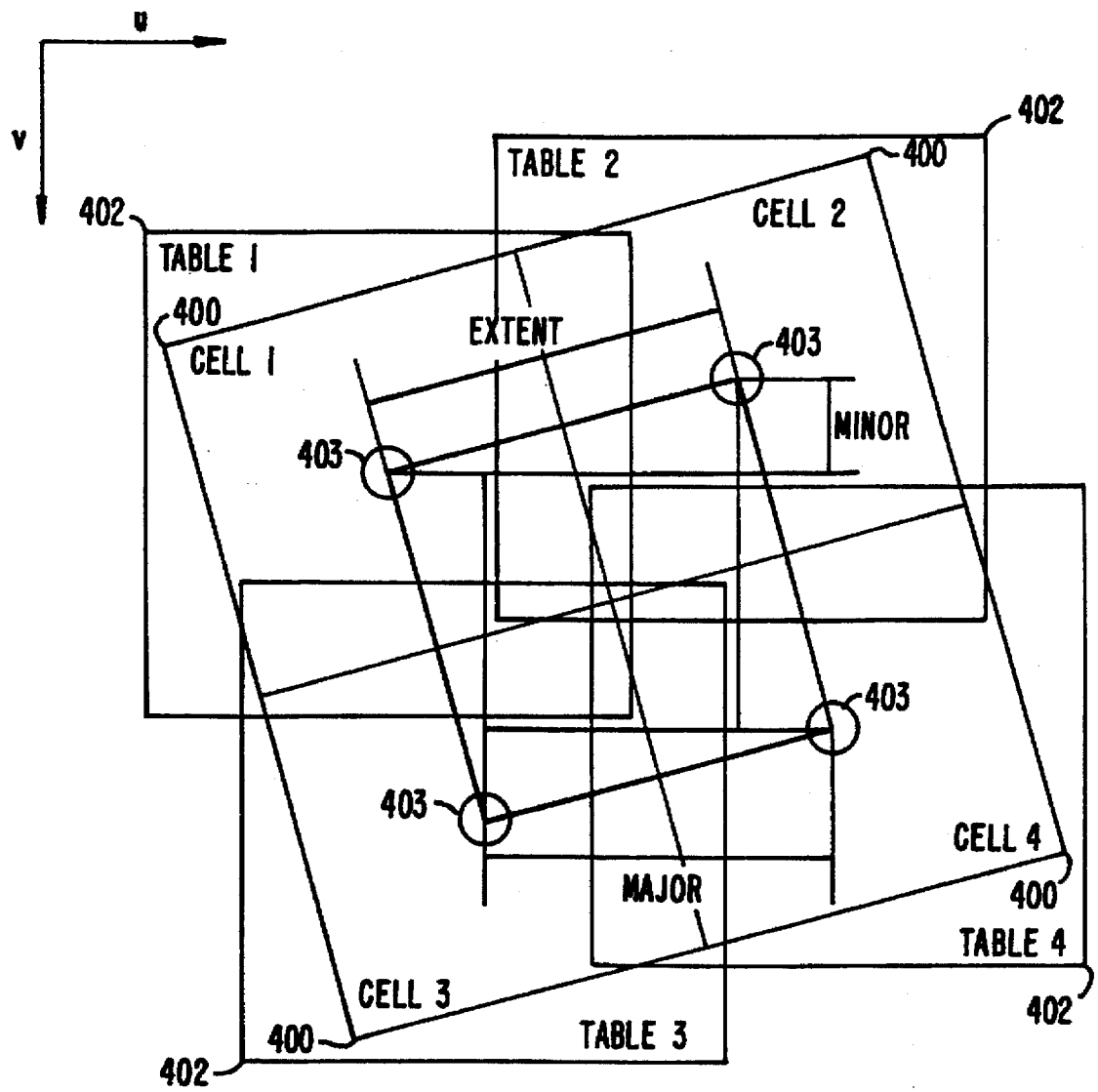
FIG. 5 depicts dimensions of halftone cells used by the technique of the invention.

These quantities are illustrated in FIG. 5, which, like FIG. 4, shows the case of a screen which has been rotated by 15 degrees. FIG. 5 has the same units of measurement as FIG. 4 and the various parameters take on the values in Table 3.

TABLE 3

| Parameter | Value |
|---|---|
| $\Theta$ | 15 degrees; |
| extent | 6.0; |
| cos ($\Theta$) | 0.258819045102520739 |
| sin ($\Theta$) | 0.965925826289068312 |
| major | 5.7955549577344101 |
| minor | 1.55291427061512444 |
| square | 2.12132034355964283 |

Let the given halftone dot cell be cell 1 of FIG. 5, and let the u-v coordinates of a point with respect to cell 1 be denoted (u, v). The coordinates of any given point can be reexpressed in the coordinate system of the cell to the right and above the given cell. (In FIG. 5, the cell above and to the right of cell 1 is cell 2.) Let the coordinates of the point when reexpressed in this coordinate system be denoted (u(right), v(right)).

Similarly, the coordinates of any given point can be reexpressed in the coordinate system of the cell below and to the right of the given cell. (In FIG. 5, the cell below and to the right of cell 1 is cell 3.) Let the coordinates of the point when reexpressed in this coordinate system be denoted (u(below), v(below)).

It is apparent from FIG. 5 that for any point:

(4) u(right)=u–major;

(5) v(right)=v+minor;

(6) u(below)=u–minor; and (7) v(below)=v–major.

The relationships in (4)–(7) supply the tools needed to define an algorithm for computing, for each of a sequence of microdots from one horizontal raster of the image, the threshold element cell in which the microdot is located.

Referring now to FIG. 5, letting (un, vn) be the u-v coordinates of cell n, with coordinates in each case centered on the center of the halftone grid cell, results in the following:

(8) u2=u1–major;

(9) v2=v1+minor;

(10) u3=u1–minor;

(11) v3=v1–major.

Figure 6:
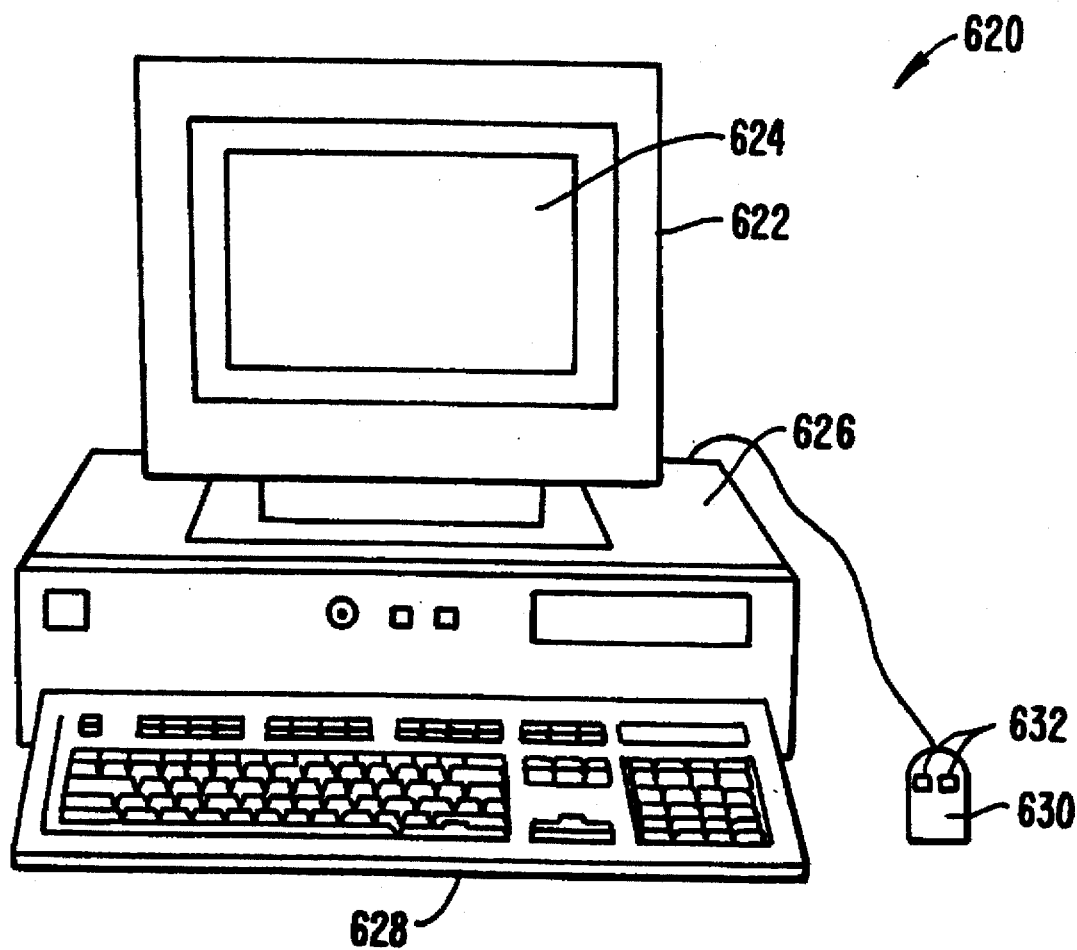
FIG. 6 depicts computer hardware suitable for implementing the invention.

FIG. 6 depicts computer hardware suitable for implementing the present invention. FIG. 6 shows a computer system 620 including a monitor 622, display screen 624, housing 626, keyboard 628 and mouse 630. Mouse 630 may have one or more mouse buttons, such as buttons 632. Housing 626 encloses typical computer components such as a processor, memory, disk drives and peripheral interface adaptor (not shown).

FIG. 6 represents but one type of computer system suitable for embodying the present invention. Other types of computer systems suitable for use in the present invention include so-called "notebook," "palmtop" or "hand-held," "pentop," etc., computers. Further, the use of the term "mouse" or "user input device" is understood to include relative and absolute pointing devices, as well as other means for inputting information into a computer such as a touch screen, trackball, MIDI keyboard, light pen, data glove, etc. It will be readily apparent to one of ordinary skill in the art that many types of computer hardware, and configurations of the hardware, are suitable for use in conjunction with the present invention.

Figure 7:
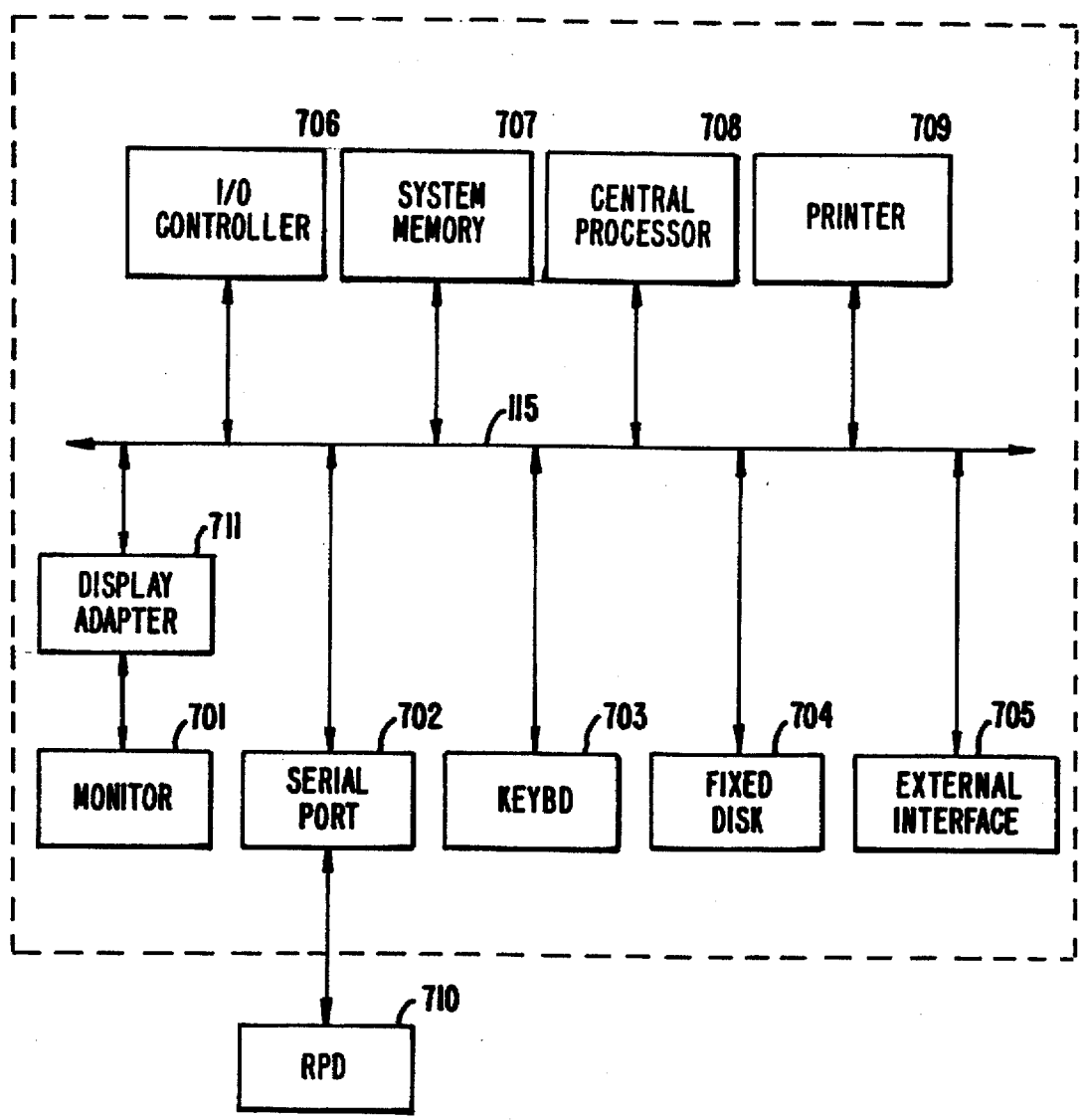
FIG. 7 is a raster image processing system for implementing the halftoning processes of the invention using the computer system 1.

FIG. 7 depicts a raster image processing and halftoning system 700 for implementing image halftoning using the computer system 1. A raster image processing system 700 includes a computer system 750 coupled to a relative-pointing device (RPD) 710, for example a trackball or a mouse. The computer system 750 includes a central processor 708, a system memory 707, an input device, for example a keyboard 703, a fixed disk 704, a monitor 701, an external interface 705, a printer 709, an input/output (I/O) controller 706, a communications port 702, and a display adapter 711. A system bus 715 connects the components of the computer system 750, providing a link among them. The keyboard 703 and RPD 710, taken individually or jointly, are data entry devices with which a user of the computer system 750 can interact with the raster image processing and halftoning system 700.

The preferred embodiment uses an appropriately programmed workstation marketed by Sun MicroSystems known as a SparcStation using a UNIX-compatible operating system known as SUN-OS. It is to be understood that other platforms are available and may embody the invention in other forms. The invention is not limited to embodiments that include workstations, but may include other platforms, such as Apple Macintosh (R) computers (Apple Computer, Cupertino, Calif.) or IBM-compatible PCs, for example. The flowchart of FIGS. 9–11 and FIG. 13 are implemented by the central processor 708 under appropriate process control and instruction from procedures stored in the system memory 707 and provided as part of the raster image processing and halftoning system 700.

Figure 8:
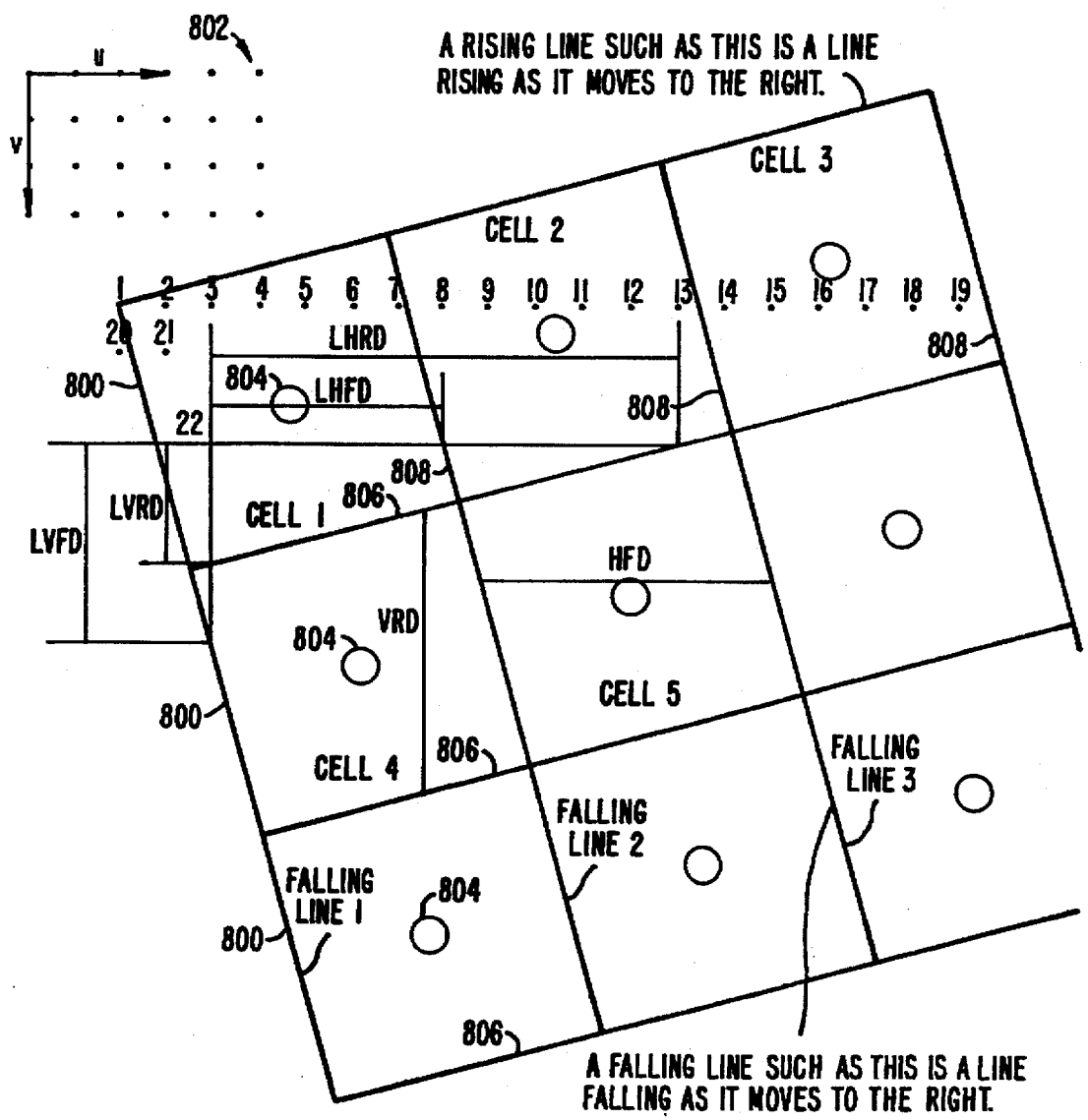
FIG. 8 depicts threshold table address computation in accordance with the invention.

FIG. 8 depicts threshold table address computation in accordance with the invention. FIG. 8 shows halftone dot cells 800 rotated relative to a microdot grid 802. The halftone dot cells 800 have centers 804. Table 4 gives definitions useful in describing FIG. 8.

TABLE 4

| Parameter | Value |
|---|---|
| u | the horizontal coordinate of the current position measured relative to the top left of the page, with coordinates scaled so that the distance between adjacent microdots is 1. |
| v | the vertical coordinate of the current position measured relative to the top left of the page, with coordinates scaled so that the distance between adjacent microdots is 1. |
| current position | the microdot which is to be processed; i.e., the microdot for which the corresponding threshold element cell in a threshold table is to be computed. |
| lu | local u, the horizontal coordinate of the current position measured relative to the top left of the current halftone cell, with coordinates scaled so that the distance between adjacent microdots is 1. |
| dlu | a double-precision floating point representation of lu. |

TABLE 4-continued

| Parameter | Value |
|---|---|
| ilu | an integer representation of lu. |
| lv | local v, the vertical coordinate of the current position measured relative to the top left of the current halftone cell, with coordinates scaled so that the distance between adjacent microdots is 1. |
| dlv | a double-precision floating point representation of lv. |
| ilv | an integer representation of lv. |
| rising line | a line that rises as it moves from left to right. |
| hrd | extent / sin($\Theta$), horizontal rising distance |
| lhrd | local horizontal rising distance |
| falling line | a line that falls as it moves from left to right. |
| hfd | extent / cos(theta), horizontal falling distance |
| lhfd | local horizontal falling distance |
| vfd | vertical falling distance |
| lvfd | local vertical falling distance |
| vrd | vertical rising distance |
| lvrd | local vertical rising distance |
| $\Theta$ | the angle of rotation of the halftone screen. |
| extent | the size (height and width; height = width) of a square halftone dot cell. |
| major | the larger of the two values extent*sin($\Theta$) and extent*cos($\Theta$); in case of a rotation angle of less than 45 degrees, as assumed here, major = extent * cos($\Theta$). |
| minor | the smaller of the two values extent*sin($\Theta$) and extent*cos($\Theta$); in case of a rotation angle of less than 45 degrees, as assumed here, minor = extent * sin($\Theta$). |
| incr_hfd | the amount by which to increment the hfd when the vfd or vrd decrements, as for example, by vertical motion from microdot 1 to microdot 20 in FIG. 8; |
| incr_hfd decr_hrd | minor / major; the amount by which to decrement the hrd when the vfd or vrd decrements, as for example, by vertical motion from microdot 1 to microdot 20 in FIG. 8. |
| decr_hrd | major / minor; |

These definitions of Table 4 will be made clearer with reference to FIG. 4 and FIG. 8. These figures display halftone dot cells and a microdot grid with the same geometry, and differ only in the details they include or omit. In FIG. 8 and FIG. 4, the lu-lv coordinate system for each halftone cell has its origin four units to the left and above each halftone dot cell center. Specifically, in FIG. 4, in which the halftone dot cell boundaries are shown, each halftone cell 402 has its origin four units to the left and above each halftone dot center 403. In FIG. 8, in which the halftone cell boundaries are not shown, each halftone cell has its origin four units to the left and above each halftone dot cell center 804.

Hence the coordinates of the center 804 in FIG. 8 with respect to the halftone dot cell in which it lies are (lu, lv)=(4.0, 4.0) and the coordinates of the center 403 in FIG. 4 with respect to the halftone dot cell in which it lies are (lu,lv)=(4.0, 4.0). The coordinates of the point 1 in FIG. 8 and of the pint 1 in FIG. 4 with respect to the local halftone dot cell are (dlu, dlv)=(0.325765385825232734, 1.87867965440357l7). Hence the integer coordinates are (ilu, ilv)=(0,1). The coordinates of point 22 in FIG. 8 with respect to the local halftone dot cell are (dlu,dlv)= (2.325765385825232373, 4.87867965644035717). Hence, the integer coordinates of point 22 are (ilu, ilv)=(2,4).

Referring again to Table 4, rising lines 806 are the bottom edges of rows of halftone cells; that is, they were the 'bottom' ignoring rotation of the halftone grid. The horizontal rising distance, hrd, is then the distance, horizontally, between two successive rising lines.

In the situation illustrated in FIG. 8, the hrd is 23.1822198309376404. The hrd is not plotted in FIG. 8 because not enough halftone dot cells are plotted.

The distance horizontally and to the right from the current position to the nearest rising line is lhrd. At microdot 22 of FIG. 8, the lhrd is 9.9860674082310048

Referring again to Table 4, falling lines 808 are the right edges of rows of the halftone cells, that is, they are the 'right' ignoring rotation of the halftone grid. The horizontal falling distance, hfd, is then the distance, horizontally, between two successive falling lines. In FIG. 8, the hfd is 6.21165708246049775.

The local horizontal falling distance, lhfd, is the distance horizontally and to the right from the current position to the nearest falling line 808. At microdot 22 of FIG. 8, the lhfd is 5.01550465975386572.

The vertical falling distance, vfd, is the distance, vertically, between two successive falling lines. Necessarily, for all halftone arrays vfd=hrd.

In the situation illustrated in FIG. 8, the vfd is 23.1822198309376404. The vfd is not plotted in FIG. 8 because not enough halftone dot cells are shown for the vfd to be plotted.

The local vertical falling distance, lvfd, is the distance vertically and down from the current position to the nearest falling line 808.

The vertical rising distance, vrd, is the distance, vertically, between two successive rising lines. Necessarily, for all halftone arrays vrd=hfd. In FIG. 8, the vrd is 6.21165708246049775.

The local vertical rising distance, lvrd, is the distance vertically and down from the current position to the nearest rising line 808.

The angle of rotation of the halftone screen is Θ. In FIG. 8, Θ=15 degrees, sin(Θ)=0.258819045102520739, and cos(Θ)=0.965925826289068312. Also, in FIG. 8, extent=6.0, major=5.7955549577344101 and minor= 1.55291427061512444.

Table 5 shows which values are constants, invariant with respect to the current position, and which values vary as the current position varies.

TABLE 5

| Constants | Variables |
| --- | --- |
| theta | u |
| extent | v |
| minor | lu |
| major | lv |
| hrd | lhrd |
| hfd | lhfd |
| vrd | lvrd |
| vfd | lvfd |
| incr_hfd | |
| decr_hrd | |

Figure 9:
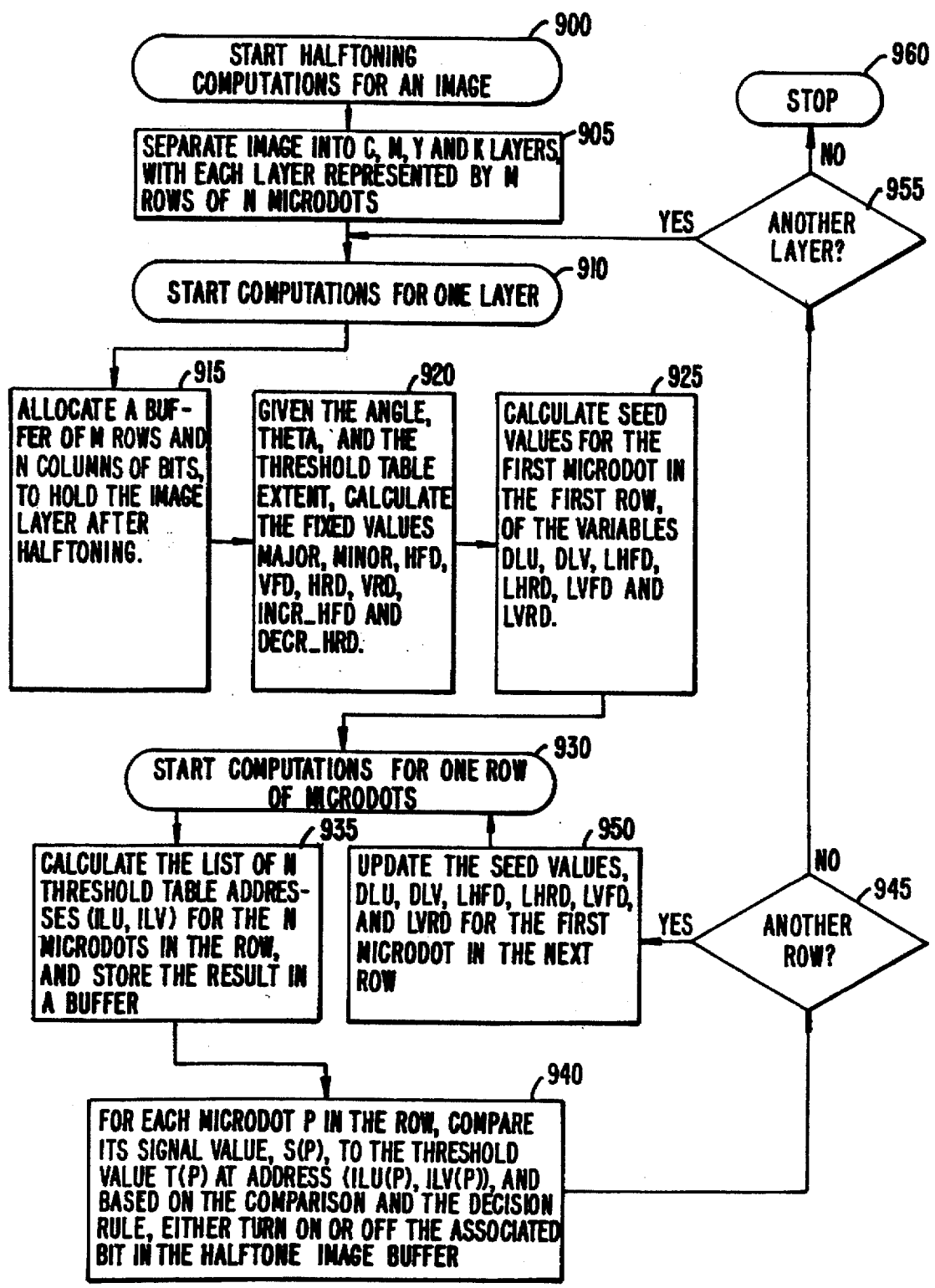
FIG. 9 is a top-level flowchart describing the steps of performing halftone computations in accordance with the invention.

FIG. 9 is a top-level flowchart describing the steps of performing halftone computations using raster image processing system 700 in accordance with the preferred embodiment. At step 900, the raster image processing system 900 acquires an image, typically from a scanner, and begins halftone computations. At step 905, the image is separated into cyan, magenta, yellow and black (C,M,Y and K) image layers, with each image composed of a regular grid of continuous tone image values. Each separation is retained in the system memory 707 of the raster image processing system 700. At step 910 the halftoning calculations for one layer of the image starts. At step 915, the raster image processing system 700 allocates a buffer of M rows, each containing N bits, to hold the image layer after halftoning. A typical application might be halftoned onto a microdot grid at 2,400 dots per inch. If the image is 8 inches wide and 11 inches high, there would then be M=11*2,400=26,400 rows, each containing N=8*2,400=19,200 bits.

At step 920, given the angle of rotation of this separation, Θ, and given the threshold table extent, the fixed values major, minor, hfd, hrd, vrd, incr_hfd and decr_hrd, as defined above, are calculated.

At step 925, seed values are calculated for the first (leftmost) microdot in the first (topmost) row, of the variables dlu, dlv, ilu, ilv, lvrd, lvfd, lhfd and lhrd. Referring to FIG. 8, since computations begin on a halftone dot cell boundary,

(12) lhrd=hrd=23.1822198309376404;

(13) lhfd=hfd=6.21165708246049775;

(14) lvfd=0.0; and

(15) lvrd=hfd=6.21165708246049775.

Also in FIG. 8, in which the lu and lv coordinates are displaced so that the center of each cell has coordinates 4.0, 4.0

(16) dlu=0.325765385825232734;

(17) dlv=1.87867965644035717; so that

(18) ilu=0; and

(19) ilv=1.

At step 930, calculations of threshold table addresses, ilu and ilv, begin for the first row of the image. The list of N threshold table address-pairs, (ilu, ilv), is computed at step 935, and the result is stored in a buffer. This step will be described in detail with reference to FIGS. 10 and 11.

At step 940 the buffer of threshold table addresses is used, in conjunction with a buffer of signal values, to produce a list of N halftone values for the first row. The procedure is, for each microdot P (in the range 0 to N−1, inclusive) in the row, compare its signal value, S(P), to the threshold value T(P) at address (ilu(P), ilp(P)), and based on the comparison and a decision rule either turn on or off the bit at location P of this row in the halftone image buffer.

Figure 13:
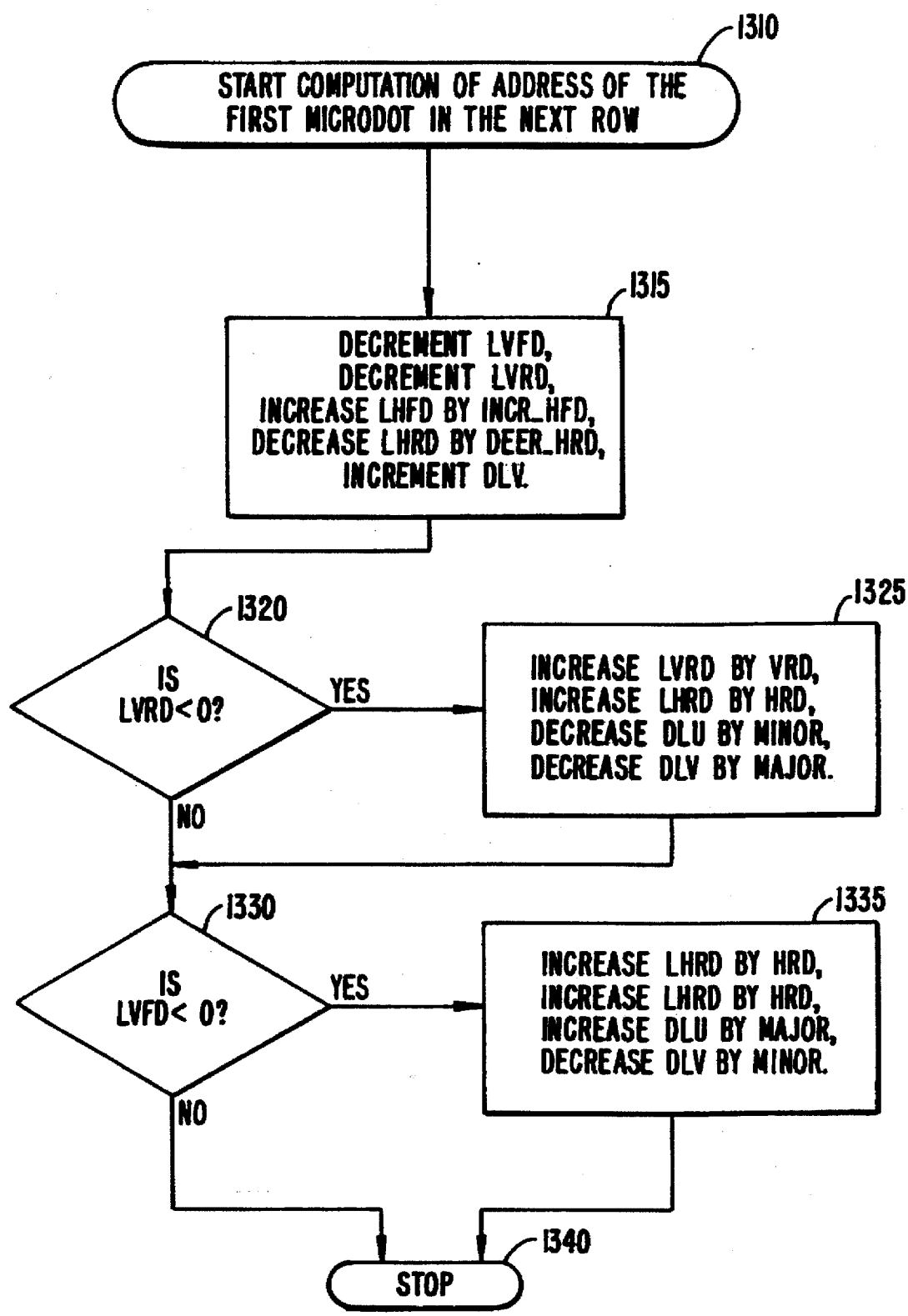
FIG. 13 is a flowchart describing the steps of a pure incrementation algorithm for computation of the seed values for the next row in accordance with the invention.

At step 945 the raster image processing system 700 ascertains whether or not this row is the final row in the image. If this row is not the final row in the image, execution proceeds to step 950. At step 950, the seed values dlu, dlv, ilu, ilv, lvrd, lvfd, lhfd and lhrd are computed for the next row of the image. FIG. 13 describes this step in detail.

Once the seed values are calculated for the next row, execution proceeds to step 930 again, and performs the calculations for the next row in steps 930, 935 and 940.

Execution of steps 930 through 940 repeats for every row in the image until it is determined at step 945 that all the rows have been processed. Execution then proceeds to step 955 at which time it ascertains whether there are more layers in the image. Execution of steps 910 through 950 repeats for each separation until it is determined at step 955 that there are no more separations. Execution then halts at step 960.

Figure 10:
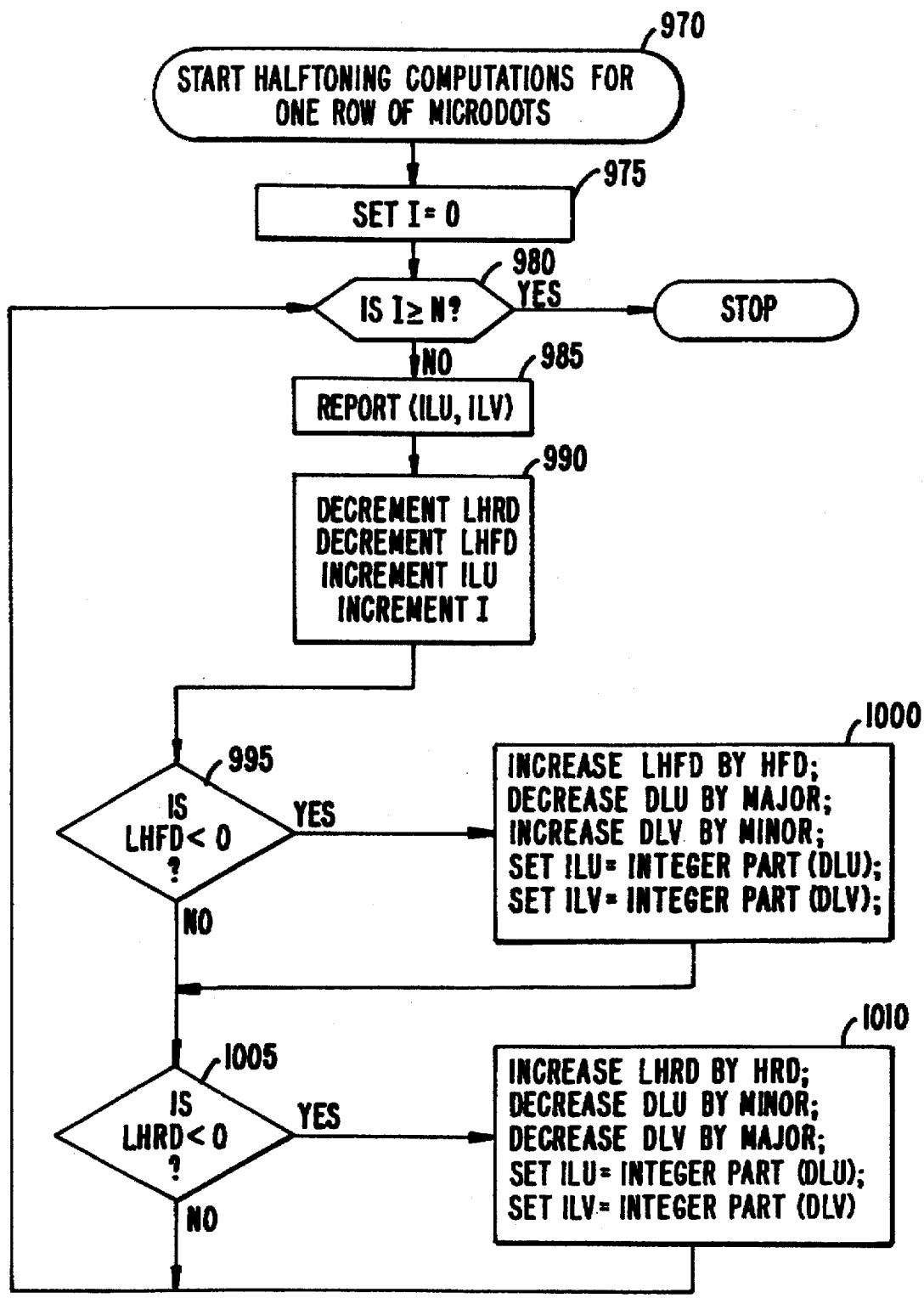
FIG. 10 is a flowchart describing the steps of performing threshold table address computations for a single row of microdots in accordance with an alternative embodiment of the invention.
Figure 11:
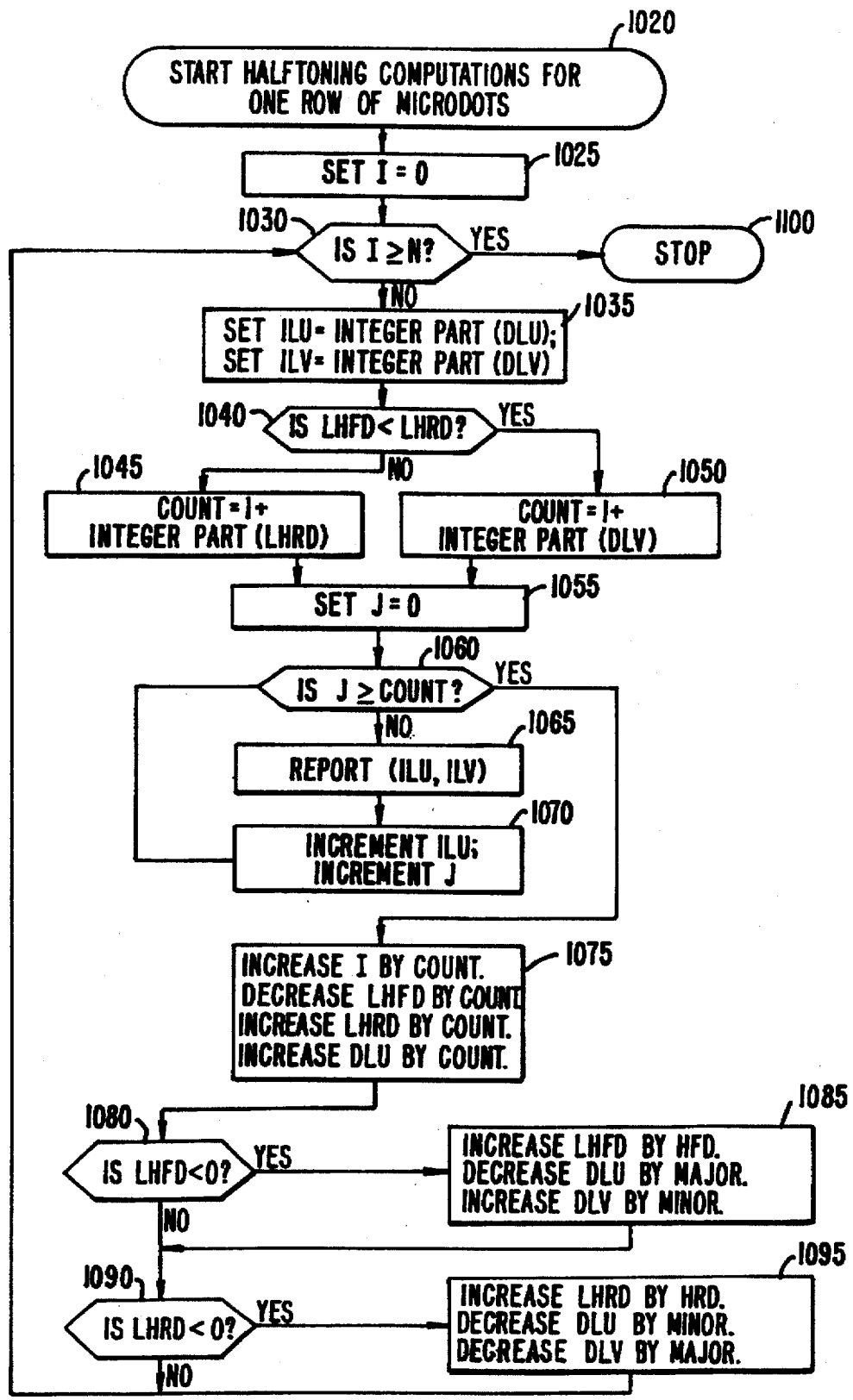
FIG. 11 is a flowchart describing the steps of performing threshold table address computations for a single row of microdots in accordance with the preferred embodiment of the invention.

FIG. 10 and FIG. 11 are flowcharts describing two distinct procedures in accordance with the invention for calculating the list of N threshold table addresses (ilu, ilv) for the N microdots in a single row. Thus FIG. 10 and FIG. 11 describe step 935 of FIG. 9 in further detail. FIG. 11 shows the handling of this step in accordance with the preferred embodiment by a process herein referred to as the "incrementation by widths" algorithm. FIG. 10 shows an alternative simpler embodiment, herein referred to as the "pure incrementation" algorithm.

FIG. 10 will be described first. The steps of the pure incrementation algorithm will be described in reference to the example of FIG. 8. Execution of the steps of FIG. 10 accomplishes the traversal of the horizontal sequence of microdots from 1 to 18 in FIG. 8, calculating unrotated threshold table addresses, ilu and ilv for each of the N microdots. At step 970, processing begins at microdot 1. Visual inspection of FIG. 4 (which has the same scale as FIG. 8) shows that the result of this process for the first 13 microdots will be as shown in Table 6.

TABLE 6

| Microdot | threshold element cell | Halftone Dot Cell |
| --- | --- | --- |
| 1 | (ilv = 1, ilu = 0) | cell 1 |
| 2 | (ilv = 1, ilu = 1) | cell 1 |
| 3 | (ilv = 1, ilu = 2) | cell 1 |
| 4 | (ilv = 1, ilu = 3) | cell 1 |
| 5 | (ilv = 1, ilu = 4) | cell 1 |
| 6 | (ilv = 1, ilu = 5) | cell 1 |
| 7 | (ilv = 1, ilu = 6) | cell 1 |
| 8 | (ilv = 3, ilu = 0) | cell 2 |
| 9 | (ilv = 3, ilu = 1) | cell 2 |
| 10 | (ilv = 3, ilu = 2) | cell 2 |
| 11 | (ilv = 3, ilu = 3) | cell 2 |
| 12 | (ilv = 3, ilu = 4) | cell 2 |
| 13 | (ilv = 3, ilu = 5) | cell 2 |

Six prerequisite variable values (for Microdot 1, the first microdot in the row) have been pre-computed, at step 925 of FIG. 9:

(20) lhrd=23.1822198309376404;

(21) lhfd=6.21165708246049775;

(22) dlu=0.325765385825232734;

(23) dlv=1.87867965644035717;

(24) ilu=0; and

(25) ilv=1.

The pure incrementation procedure also makes use of four constants:

(26) hrd=23.1822198309376404;

(27) hfd=6.21165708246049775;

(28) major=5.7955549577344101; and

(29) minor=1.55291427061512444.

Lhrd and lhfd decrement progressively until one of them turns negative. When lhfd or lhrd turns negative, this indicates that a cell boundary has been crossed. On each decrementation pass, ilu increments, and the coordinates ilu, ilv are reported.

At step 975, the integer i is set equal to zero. The integer i serves as a counter of microdots for the row. Execution then proceeds to step 980, where i is compared to N. If i>=N, processing of the row is complete. In this example, i is now 0, so it is not greater than (or equal to) N, and execution proceeds to step 985.

At step 985, the values of ilu and ilv are reported. This report may consist of writing them into a buffer which the higher level calling procedure may access, or of otherwise returning them to the calling procedure. Referring again to FIG. 8, the first report will be (ilu, ilv)=(0, 1).

Execution now proceeds to step 990, which corresponds to moving from point 1 of FIG. 8 to point 2 of FIG. 8. Now lhrd and lhfd are decremented (since we are one unit closer to both the next horizontal rising line and the next horizontal falling line). Thus,

(30) lhrd=22.1822198309376404; and

(31) lhfd=5.21165708246049775.

Ilu and the row-position counter i also increment:

(32) ilu=1; and

(33) i=1.

At step 995 the sign of lhfd is tested. In this example, lhfd is positive, so execution proceeds to step 1005 where the sign of lhrd is tested. Lhrd is also positive so execution proceeds to step 980 where i (which is now 1) is still less than N (which might be 19,200). So execution continues to step 985 at which the current values of ilu and ilv are reported: (ilu, ilv)=(1, 1).

The algorithm continues in this vein, looping through steps 980 to 1005, each time failing the boundary-crossing tests at steps 995 and 1005, for the first 7 points. Some of the results are shown here in Table 7, keyed to steps in FIG. 10.

TABLE 7

| Step | i | point | action |
| --- | --- | --- | --- |
| 985 | 1 | 2 | report (ilu, ilv) = (1, 1); |
| 990 | | | decrement lhrd to 21.1822198309376404. |
| | | | decrement lhfd to 4.21165708246049775. |
| | | | increment ilu to 2 |
| | | | increment i to 2 |
| ... | | | |
| ... | | | |
| 985 | 5 | 6 | report (ilu, ilv) = (5, 1); |
| 990 | | | decrement lhrd to 17.1822198309376404. |
| | | | decrement lhfd to 0.21165708246049775. |
| | | | increment ilu to 6 |
| | | | increment i to 6 |
| 985 | 6 | 7 | report (ilu, ilv) = (6, 1); |
| 990 | | | decrement lhrd to 16.1822198309376404. |
| | | | decrement lhfd to −0.788342917539502253 |
| | | | increment ilu to 7 |
| | | | increment i to 7 |

When i reaches 7, one of the two boundary-crossing tests (step 995) will succeed. The added entry to Table 7 would be:

| Step | i | point | action |
| --- | --- | --- | --- |
| 995 | 7 | 8 | Is lhfd < 0? Yes |

So execution proceeds to step 1000, which carries out the necessary inter-cell computations.

Thus, a halftone dot cell has been exited (in terms of the example in FIG. 8, we are now at point 8 in cell 2); the parameters dlu, dlv, lhfd and lhrd are the correct parameters for the current point, but with respect to the OLD coordinate system of the cell just exited (the coordinate system of cell 1 in FIG. 8). It remains to transform these four parameters into the lu-lv coordinate system of the cell just entered.

In the example of FIG. 8, the inter-cell coordinate transformations happen at step 1000 rather then step 1010. These computations are listed in the box representing step 1000 in FIG. 10. The computations were derived from FIG. 5 and equations (13) and (14). For FIG. 8, the calculations are as follows:

| Step | i | point | action |
|---|---|---|---|
| 1000 | 7 | 8 | lhfd = lhfd + hfd = −0.7883 + 6.2116 = 5.4233; dlu = dlu − major = 7.3257 − 5.7955 = 1.5302; dlv = dly + minor = 1.8786 + 1.5529 = 3.4315; ilu = integer part (dlu) = 1; ilv = integer part (dlv) = 3; |

This gives the coordinates of point 8 with respect to cell 2 of FIG. 8.

Next, execution proceeds to step 1005, to ascertain whether the incremental step from point 7 to point 8 in FIG. 8 also caused the local horizontal rising distance to go negative. If both lhrd and lhfd go negative in a single incrementation of the counter i, this indicates movement from the original cell (cell 1 of FIG. 8) to the cell diagonally opposite (cell 5 of FIG. 8). If lhfd went negative but lhrd did not, this indicates movement (as in the example from point 7 to point 8) to the cell to the right and above; from cell 1 of FIG. 8 to cell 2 of FIG. 8. If lhrd went negative but lhfd did not, this indicates movement to the cell to the right and below; from cell 1 of FIG. 8 to cell 5 of FIG. 8.

Since, in this example, the rising-line boundary-crossing test at step 1005 failed, execution proceeds to step 980, to continue processing of microdots across cell 2 of FIG. 8. These operations continue until, finally, at step 980 the microdot counter i reaches N in which case processing of this row of microdots ceases at step 1015.

The pure incrementation algorithm performs the needed tasks but is computationally costly, requiring the decrementation of two floating point numbers, lhrd and lhfd, for the generation of each address pair (ilu, ilv).

The invention also provides a more efficient incrementation by widths algorithm described in FIG. 11 and in C language computer code in Code Segment 1. The incrementation by widths algorithm takes advantage of the realization that as the variables lhrd and lhfd are decremented, the one with the smaller initial value is always the one to change sign first. The smaller of lhrd and lhfd is herein referred to as "smaller local horizontal distance," or the "slhd."

At point 1 in FIG. 8, the slhd is the local horizontal falling distance, lhfd, and its value is:

(34) slhd=lhfd=6.21165708246049775.

The number of steps needed to traverse the slhd is the integer part of the initial value of the slhd. This value is herein referred to as the "interior count." In FIG. 8, the interior count, beginning at point 1 is:

(35) interior count=integer part (slhd)=6. After moving to the right from point 1 by interior count=6 steps, the incrementation by widths algorithm encounters the last point, point 7, within cell 1. Similarly, the number of iteration steps that take the algorithm up to and including the first point in the next cell (point 8 in FIG. 4 and FIG. 8), the point after the slhd turned negative, is one plus the interior count, herein referred to as the "count." In the situation illustrated in FIG. 4 and FIG. 8, the count, beginning at point 1 is 7:

(36) count=1+integer part (slhd)=7.

Now, it is required to report "count" numbers of threshold table address pairs (ilu, ilv) within the first cell. To iterate from one such value to the next, all that is necessary is to increment the value of ilu. When the last of these address pairs has been reported, the next step will continue processing into the next cell, at which time it will be necessary to perform the same kinds of inter-cell adjustments as were performed at steps 995, 1000, 1005 and 1010 of the pure incrementation algorithm of FIG. 10.

The incrementation by widths algorithm will now be described in detail with reference to FIG. 11, Code Segment 1, and FIG. 8. Most of the same pre-requisite seed values are required as were required for the pure incrementation algorithm described earlier. Four pre-requisite variable values (for microdot 1, the first microdot in the row) will have been pre-computed, as was described at step 925 in FIG. 9:

(36) lhrd=23.1822198309376404;

(37) lhfd=6.21165708246049775;

(38) dlu=0.325765385825232734;

(39) dlv=1.87867965644035717.

The values of four constants are also required:

(40 hrd=23.1822198309376404;

(41) hfd=6.21165708246049775;

(42) major=5.7955549577344101;

(43) minor=1.552914270611512444.

Processing begins at microdot 1 in FIG. 8, which corresponds to step 1020 in FIG. 11. Execution continues through the horizontal sequence of microdots from 0 to 19, reporting the addresses, ilu and ilv, of the microdots in the unrotated threshold tables which are centered on the halftone dot cells.

At step 1025, integer i is set equal to zero. The integer i again serves as a counter of microdots for the row. Step 1025 occurs at line 24 in Code Segment 1. Execution then proceeds to step 430, where i is compared to N. If i>=N, processing of this row is complete. In this example, i is now 0, so it is not greater than or equal to N, and execution proceeds to step 1035. Step 1030 occurs at line 28 in Code Segment 1 where the variable "width" corresponds to N.

In Code Segment 1 the parameter "hrdover" is an overflow condition check parameter; as angles decrease in absolute value towards zero, the horizontal rising distance, hrd, increases without limit; eventually an angle is found that is so small that the hrd is too large to be handled on a digital computer; at an angle of exactly zero the hrd is undefined. Hence the procedure illustrated in Code Segment 1 executes an alternative code segment in cases of angles near zero in absolute value.

Step 1035 corresponds to lines 32 and 33 in Code Segment 1. The integer-valued parameters ilu and ilv are set equal to the integer parts of dlu and dlv respectively:

(44) ilu=integer part (dlu)=0;

(45) ilv=integer part (dlv)=1.

Step 1040 corresponds to lines 34 and 35 in Code Segment 1. This step sets the count equal to one plus the smaller of lhfd and lhrd. In the case illustrated in FIG. 8, lhfd is the smaller. Therefore:

(46) lhfd=6.21165708246049775;

(47) count=1+integer part(6.21165708246049775)=7.

At step 1055, corresponding to line 38 in Code Segment 1, the parameter j (j=0) for an inner loop of the algorithm is set. The inner loop corresponds to steps 1060, 1065 and 1070 and to lines 38 to 43 in Code Segment 1. The parameter j is the counter for the inner loop. It will increment "count" times, until it has a value equal to count. In this example, since count=7, j will increment 7 times until it has value 7.

Each time j is incremented, the value of the address pair (ilu, ilv) is reported. This report happens at step 1065, corresponding to lines 40 and 41 in Code Segment 1. Subsequent to this report, at step 1065 and at line 42 of Code Segment 1, the value of ilu is incremented. The counter, j, must also be incremented at step 1070, corresponding to line 38 in code segment 1.

Thus, within the inner loop, only two integer adds are required for each address calculation, the incrementation of j and of ilu at step 1070. The inner loop of steps 1060, 1065 and 1070 is exited after "count" iterations.

At step 1075, corresponding to lines 46 to 49 in Code Segment 1, parameter i, the microdot counter is increased by count. So i now indicates the number of microdots whose threshold table addresses (ilu, ilv) have been reported. The distances lhfd and lhrd are decreased by count:

(48) lhrd=lhrd−7=16.1822198309376404; and

(49) lhfd=lhfd−7=−0.788342917539502253.

So lhfd and lhrd now represent the horizontal distances to the lines which were the next falling line and the next rising line when seen from the cell just exited. For example, referring to FIG. 8, the cell just exited was cell 1. The lhfd is the distance to falling line 2 in FIG. 8. Falling line 2 was the next falling line to the right of cell 1. The fact that the distance lhfd has gone negative indicates that the line has been traversed; the current value of lhfd, −0.7883 is the value of the distance from point 8, the first point in the new cell 2.

Also in step 1075, the local u coordinate, dlu, is increased by count, so that it now represents the correct local u coordinate of point 8 with respect to the prior cell, cell 1.

At the conclusion of step 1075 all variables have the same values they have at the conclusion of step 990 in the pure incrementation algorithm of FIG. 10. Whenever the incrementation by widths algorithm concludes step 1075, a halftone dot cell has been exited (referring again to FIG. 8, processing has reached point 8 in cell 2); the parameters dlu, dlv, lhfd and lhrd are the correct parameters for the current point, but with respect to the coordinate system of the cell just exited. These four parameters are now to be transformed into the lu-lv coordinate system of the cell just entered.

The necessary inter-cell coordinate transformations are carried out at steps 1080, 1085, 1090 and 1095. These four steps are similar to steps 995, 1000, 1005 and 1010 of the pure incrementation algorithm.

When the requisite coordinate transformations at steps 1080 to 1095 have been completed, execution returns to step 1030, to start the sequence of steps which will extend across cell 2 of FIG. 8. These operations continue until, finally, at step 1030 the microdot counter, i, is at least as large as N, indicating completion of processing this row of microdots at step 1300.

The incrementation by widths algorithm and pure incrementation algorithm will now be compared. The computationally significant action of the incrementation by widths algorithm that is repeated for every microdot, is step 1070 of FIG. 11:

increment ilu (an integer value); and increment j (an integer value).

The computationally significant action of the pure incrementation algorithm that is repeated for every microdot is step 990 of FIG. 10:

decrement lhrd (a value with a fractional part);

decrement lhfd (a value with a fractional part);

increment ilu (an integer value); and increment i (an integer value).

Thus, the pure incrementation algorithm requires two integer increments and two decrements of numbers with fractional parts for each microdot. In contrast, the incrementation by widths algorithm requires only two integer increments. This does not include overhead calculations outside the inner loop. In most applications, therefore, the incrementation by widths algorithm will be faster than the pure incrementation algorithm.

However, the pure incrementation algorithm may be faster than the incrementation by widths algorithm in some applications. This is because the numbers lhrd and lhfd, which are numbers with fractional parts, can be implemented as a pair of numbers, with an integer representing the whole part and an integer or floating point number representing the fractional part. If this is done, since the decrements of lhrd involve subtracting an integer (the integer 1) from lhrd and lhfd, only the integral whole part of lhrd and lhfd would need to be decremented. The two decrements in the pure incrementation algorithm would then reduce to two integer decrements. The overall result would then be that the core action of the pure incrementation algorithm would have four integer adds (two decrements and two increments) whereas the core action of the incrementation by widths algorithm would have two integer adds (two increments). Hence it would seem, at first glance, that the incrementation by widths algorithm would still be twice as fast as the pure incrementation algorithm. However, the incrementation by widths algorithm has more overhead calculations when crossing a cell boundary (the operations at steps 1035, 1040, 1050, 1055 and 1075) than does the pure incrementation algorithm, so it is therefore possible that in some applications the pure incrementation algorithm would be faster.

Figure 12:
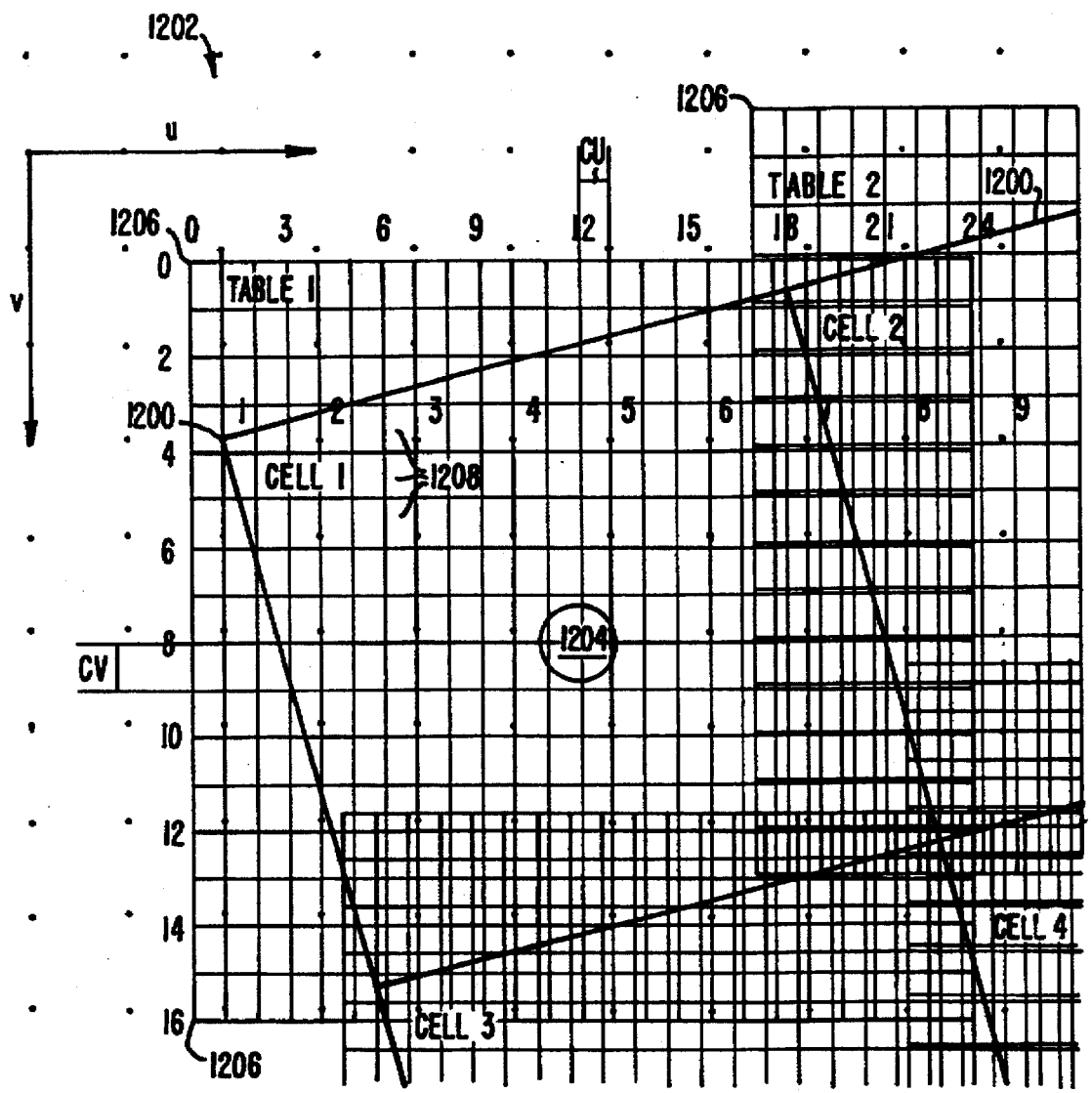
FIG. 12 describes an enhancement to the halftoning method of the invention, wherein the resolution of the threshold matrix is increased above the resolution of the microdot grid.

FIG. 12 describes an enhancement to the halftoning method of the invention, wherein the resolution of the threshold matrix is increased above the resolution of the microdot grid. FIG. 12 depicts halftone cells 1200 rotated relative to a microdot grid 1202. The halftone cells 1200 have centers 1204. Threshold matrices 1206 are aligned to the microdot grid 1202 and include threshold cells 1208 that are more closely spaced than the microdot grid 1202.

In general, the v_count of the threshold matrix (the number of columns) can be made any integer multiple of the v_extent of the matrix (its width in units of the u-v coordinate space), and the u_count (the number of rows) can be made any integer multiple of the u_extent. FIG. 12 illustrates a case in which the u_count has been made equal to 24, which is triple the u_extent of 8. Hence the width, cu, of each threshold element cell is ⅓. Also in FIG. 12 the v_count has been made equal to 16, which is twice the v_extent of 8. Hence the height, cv, of each threshold element cell is ½.

The threshold table address computation algorithm in this case is a simple modification of the algorithm described above. Incrementation along the u and v axes now occurs by ustep=1/cu (=3 in the example of FIG. 12) and by vstep=1/cv (=2 in the example of FIG. 12).

The modified algorithm will use modified initial u-coordinates and horizontal distances which are larger by the ustep than those in the original unmodified algorithm:

(50) dlu=ustep*dlu;
(51) hrd=ustep*hrd;
(52) hfd=ustep*hfd;
(53) lhrd=ustep*lhrd; and
(54) lhfd=ustep*lhfd.

and it will use v-coordinates and vertical distances which are larger by the vstep than those in the original unmodified algorithm:

(56) dlv=vstep*dlv;
(57) vrd=vstep*vrd;
(58) vfd=vstep*vfd;
(59) lvrd=vstep*lvrd; and
(60) lvfd=vstep*lvfd.

Finally, the amount by which the integer-valued local u coordinate is incremented at each step will be not 1 but ustep. This explains the incrementation parameter ustep passed into the procedure ThresholdBuffer of Code Segment 1. For the example shown in FIG. 12, ustep would have value 3, and the modified algorithm would yield, as shown in FIG. 12, an initial set of seven ilu coordinates with values 0, 3, 6, 9, 12, 15, 18.

The pure incrementation algorithm of FIG. 10 and the incrementation by widths algorithm of FIG. 11 described threshold table address computation for one horizontal raster of microdots. This process must be repeated for all the horizontal rasters in an image. In the transition between rows, it is necessary to compute the seed values for the computation of the next row. These are the initial values of dlu, dlv, lhrd and lhfd. These values are computed in step 950 of FIG. 9, by an algorithm which is analogous to one of the algorithms used to compute the addresses for one row of microdots, either the pure incrementation algorithm or the incrementation by widths algorithm.

FIG. 13 is a flowchart describing the steps of a pure incrementation algorithm for computation of the seed values for the next row in accordance with the invention. The following explanation refers to FIG. 8, FIG. 13, and to Code Segment 2. Associated with microdot 1, the first (leftmost) microdot in its row, is a set of values for the six variables dlu, dlv, lhrd, lhfd, lvrd and lvfd.

These six values are stored so that they will be available to the NextThresholdRow algorithm of Code Segment 2, whose job it is to generate the seed values for the next row (for microdot 20 in FIG. 8) from the seed values for the prior row.

The NextThresholdRow algorithm requires two other values, incr_hfd and decr_hrd, which are, respectively:

incr_hfd=the amount by which to increment the hfd when the vfd or vrd decrements, as for example, by vertical motion from microdot 1 to microdot 20 in FIG. 8; and decr_hrd=the amount by which to decrement the hrd when the vfd or vrd decrements, as for example, by vertical motion from microdot 1 to microdot 20 in FIG. 8.

These values are, respectively:

(61) incr_hfd=minor/major; and
(62) decr_hrd=major/minor.

The algorithm NextThresholdRow makes use of the same principles as were used in the incrementation algorithms of FIG. 10 and FIG. 11 which generated the threshold table addresses for a row of microdots, with the difference that it is stepping in a vertical direction rather than a horizontal direction.

Processing begins at step 1310 of FIG. 13. It then moves to step 1315 where the following five variables unconditionally execute:

(63) lvfd=lvfd−1;
(64) lvrd=lvrd−1;
(65) lhfd=lhfd+incr_hfd;
(66) lhrd=lhrd−decr_hrd; and
(67) dlv=dlv+1.

The preceding actions occur at lines 32 to 36 in Code Segment 2.

The coordinate changes computed by NextThresholdRow correspond to vertical motion, as in the motion from point 1 to point 20 in FIG. 8. After step 1315, the five values listed above are the coordinates of the new point (point 20 in FIG. 8), but in the lu-lv coordinate system of the prior point (point 1 in FIG. 8).

The algorithm's next task to ascertain whether a new halftone dot cell has been entered, and if so to make the appropriate coordinate transformations. As in the algorithms for horizontal motion across a row of microdots, the determination of whether or not a new cell has been entered is based on the sign of the numbers representing the distances to the next rising and falling lines. In this case, however, the relevant distances are the vertical distances, the local vertical falling distance, lvfd, and the local vertical rising distanced, lvrd.

Whenever one of the two values lvfd or lvrd goes negative, this indicates that a new halftone dot cell has been entered, causing adjustment of the local coordinate, dlu and dlv, to the new cell using the relations described in equations (4) to (7) and illustrated in FIG. 5. The appropriate adjustments are also made to lvrd, lvhd, lhrd and lhvd. In FIG. 13 these tests and the resulting actions occur at steps 1320, 1325, 1330 and 1335.

Step 1320 ascertains whether the incremental step from point 1 to point 20 in FIG. 8 also caused lvrd to go negative. This would indicate movement from the original cell to the cell below it and to the right, as if moving downward from cell 1 to cell 4 of FIG. 8, or from cell 2 to cell 5 of FIG. 8. If lvrd went negative execution proceeds to step 1325, corresponding to lines 46 to 49 in Code Segment 2.

Step 1330 ascertains whether the incremental step from point 1 to point 20 in FIG. 8 also caused lvfd to go negative. This would indicate movement from the original cell to the cell to the left of it, as if moving downward from cell 2 to cell 1 of FIG. 8, or from cell_5 to cell_4 of FIG. 8. If lvfd went negative, execution proceeds to step 1335, corresponding to lines 54 to 57 in Code Segment 2.

If both lvrd and lvfd go negative in a single step, this indicates movement from the original cell to the cell diagonally opposite, as if moving from cell 2 of cell 4 of FIG. 8. In this case the coordinate transformations at step 1325 will be executed first, giving the correct coordinates for the cell below and to the right of the original cell (cell 5 of FIG. 8), and these coordinates will then be input into the coordinate transformation of step 1335, which will yield the coordinates of the cell to the left of the input cell, cell 4 in FIG. 8.

When any coordinate transformations required by steps 1320 and 1330 are made, at steps 1320 to 1325, the NextThresholdRow algorithm of FIG. 13 is finished and execution to proceeds to step 1340. It has done its necessary work, the computation of new values of the variables dlu, dlv, lhfd and lhrd. These are then available as seed values for the next iteration of the row address algorithm. Referring to FIG. 9, completion of the NextThresholdRow algorithm of FIG. 13 corresponds to exiting the box denoting step 950. The next action in FIG. 9 is to start calculations of a row, at step 930.

This invention has been described in conjunction with the preferred embodiment. Numerous other alternatives and variants will be apparent to those skilled in the art of the foregoing description. For example, the preferred embodiment has been described as one in which of horizontal rows of microdots are processed successively from left to right and from top to bottom. A trivial variant would be to have the rows scanned from right to left. Or the basic unit of processing could consist of columns rather than rows, with successive columns processed from top to bottom and from left to right, for example.

Another variation apparent to those skilled in the art consists of using the coordinates of the microdots in the local unrotated coordinate system of each halftone dot cell—the coordinates dlu and dlv—not as entries into a threshold table, but as the basis for algorithmic computation of threshold values. In this approach, the threshold value at point P, P(t), is not the value found in a threshold table T at the address (ilu(P), ilv(P)), but is the result of some functional computation, P(t)=f(dlu(P), dlv(P)), where f is a function which transforms pairs of numbers with fractional parts (dlu and dlv) into a single number (with or without a fractional part). In a further variation, the above-described techniques are implemented by special purpose hardware rather than by software executing on a general purpose computer.

Code Segment 1:

```
1    static void
2    ThresholdBuffer (width, dlu, dlv, hrd, hfd, lhrd, lhfd,
3        minor, major, u_input, v_input, ustep, hrdover)
4    int       width;
5    double    *dlu; /* (double) local u. Variant.*/
6    double    *dlv; /* (double) local v. Variant.*/
7    double    hrd; /* horizontal rising distance. Const. */
8    double    hfd; /* horizontal falling distance. Varies. */
9    double    lhrd; /* local horizontal rising distance. */
10   double    lhfd; /* local horizontal falling distance. */
11   double    minor;
12   double    major;
13   double    *u_input; /* u coordinates returned to caller. */
14   double    *v_input; /* v coordinates returned to caller. */
15   unsigned  ustep; /* Amount to increment u. */
16   unsigned  hrdover; /* Overflow of hrd if 0 deg. angle. */
17   {
18       int i, j;
19       int ilu, ilv;
20       unsigned count; /* counts n of increments; applied to
22           * things which don't have to be
23           * incremented for each cell. */
24       i = 0;
25
26       if (!hrdover)
27       {
28           while (i < width)
29           {
30               /* Part 0: calc ilu & ilv from dlu & dlv,
31                * & set count based on lhfd & lhrd. */
32               ilu = dlu;
33               ilv = dlv;
34               if (lhfd < lhrd) count = lhfd + 1;
35                   else count = lhrd + 1;
36
37               /* Part 1 Basic Loop; E.g. may loop 6 times. */
38               for (j = 0; j < count; j++)
39               {
40                   *u_input++ = ilu;
41                   *v_input++ = ilv;.
42                   ilu += ustep;
43               }
44
45               /* Part 2: Unconditional Incrementation. */
46               i    += count;
47               lhfd -= count;
48               lhrd -= count;
49               dlu += count;
50
```

Code Segment 1:
-continued

```
51               /* Part 3: Update lhfd, lhrd, dlu & dlv for
52                * next loop depending on what tripped. (If
53                * they both tripped, execute both code chunks,
54                * & go to the right-below cell.)
55                */
/*
*/
56               if (lhfd < 0)
57               /* HFD tripped; we're going to the right cell*/
58               {
59                   lhfd += hfd;
60                   dlu -= major;
61                   dlv += minor;
62               }
63
64
65               if (lhrd < 0)
66               /* HRD tripped; we're going to the below cell*/
67               {
68                   lhrd += hrd;
69                   dlu -= minor;
70                   dlv -= major;
71               }
72
73           } /* End while (i < width) */
74       } /* End if (!hrdover) */
75       else
76       /* if (hrdover) */
77       {
78           while (i < width)
79           {
80
81               /* . . . Code omitted here . . . */
82
83           } /* End while (i < width) */
84
85       } /* End if (hrdover) */
86
87   } /* End function ThresholdBuffer */
/*
*/
```

Code Segment 2

```
1    static void
2    NextThresholdRow(ascend, cellw, lu, lv, vfd, vrd, lhrd, lhfd,
3        lvrd,lvfd, minor,major, incr_hfd,decr_hrd,hrdover)
4    unsigned  ascend;     /* Ascending or descendng intersectns*/
5    double    cellw;
6    double    *lu;        /* Local u coordinate (wrt ht cell) */
7    double    *lv;        /* Local v coordinate (wrt ht cell) */
8    double    vfd;        /* We pass in the horiz'l rising dist,
9                           * but this is the same as the vert'l
10                          * falling dist; hrd = vfd.
11   double    vrd;        /* We pass in the horiz'l falling
12                          * dist but this is the same as the
13                          * vert'l rising dist; hfd = vrd. */
14   double    *lhrd;      /* Local horizontal rising dist. */
15   double    *lhfd;      /* Local horizontal falling dist. */
16   double    *lvrd;      /* Local vertical rising dist. */
17   double    *lvfd;      /* Local vertical falling dist. */
18   double    minor;
19   double    major;
20   double    incr_hfd;   /* hfd incr as vfd or vrd decremnts */
21   double    decr_hrd;   /* hrd decr as vfd or vrd decreents */
22   unsigned  vstep;      /* Amount to increment v. */
23   unsigned  hrdover;    /* Overflow of hrd if 0 deg. angle. */
24   {
25
26       if (!hrdover)
27       {
28
29           if (ascend)
30           {
31               /* Part 1: Basic increments/decrements. */
```

-continued

Code Segment 2

```
32        (*lvfd)--;
33        (*lvrd)--;
34        (*lhfd) += incr_hfd;
35        (*lhrd) -= decr_hrd;
36        (*lv) += vstep;
37
38        /* Part 2: Update *lvfd, *lvrd, *lhfd, *lhrd,
39         * lu & *lv depending on what tripped. (If
40         * both tripped, both code chunks execute, &
41         * go to the below left cell.
42         */
43        if (*lvrd < 0)
44        /* vrd tripped; go down to the below cell. */
45        {
46           (*lvrd) += vrd;
47           (*lhrd) += vfd;
48           (*lu) -= minor;
49           (*lv) -= major;
50        }
/*
*/
51        if (*lvfd < 0)
52        /* vfd tripped; go to the left cell. */
53        {
54           (*lvfd) += vfd;
55           (*lhfd) -= vrd;
56           (*lu) += major;
57           (*lv) -= minor;
58        }
59      }
61      else
62      /* if (!ascend) */
63      {
64
65         /* ... Code omitted here. */
66
67      } /* End else if (!ascend) */
68
69      } /* End if (!hrdover) */
70
71      else
72
73      /* If (hrdover); zero degree angle. Note. Variable
74       * "ascend" is irrelevant; 0 degrees =- 0 degrees. */
75      {
76
77         /* ... Code omitted here. */
78
79      } /* End if (!hrdover) */
80
81    } /* End procerure NextThresholdRow. */
82
```

What is claimed is:

1. In a digital halftone system wherein images are represented by a matrix of microdots located on an orthogonal rectangular u-v coordinate grid having a u axis and a v axis, wherein said matrix of microdots is divided into a plurality of square halftone cells with the centers of the halftone cells located on an orthogonal rectangular x-y coordinate grid, the x-y grid being oriented at a reference angle, θ, to the u-v coordinate grid, a computer-implemented method for assigning correspondences between threshold matrix cells and microdots, comprising the steps of:

a) storing a threshold matrix including rows and columns of threshold element cells containing threshold values, each threshold element cell addressable by identifying its row and column;

b) assigning correspondences between microdots of a row of microdots and addresses of said threshold element cells, wherein successive adjacent microdots within a given halftone cell are assigned in sequence, in a predetermined direction, to successive threshold element cells separated by a predetermined integer number of columns within a row of the threshold matrix; and c) determining, whether a next adjacent microdot in the row is outside the given halftone cell;

d) upon a determination in said c) step that said next adjacent microdot in the row is outside the given halftone cell, computing an alignment between said threshold matrix and a next halftone cell containing said next adjacent microdot; and e) assigning a threshold element cell to said next adjacent microdot responsive to said alignment.

2. The method of claim 1 wherein said c) step comprises the substeps of:

c1) updating first horizontal distance information stored in an electronic memory device and indicating a horizontal distance between said next adjacent microdot and a rising boundary between halftone dot cells that is nearest in the predetermined direction;

c2) updating second horizontal distance information stored in the electronic memory device and indicating a horizontal distance between said next adjacent microdot and a falling boundary between halftone dot cells that is nearest in the predetermined direction; and c3) monitoring said first horizontal distance information and said second horizontal distance information to determine if a boundary between halftone dot cells has been crossed.

3. The method of claim 2 wherein said C1) step and said C2) steps are integer calculations.

4. The method of claim 1 wherein said b) step comprises the substep of:

b1) identifying a boundary between halftone dot cells that is nearest along said row in said predetermined direction.

5. The method of claim 4 wherein said c) step comprises the substeps of:

c1) updating horizontal distance information stored in an electronic memory device and indicating a horizontal distance between said next adjacent microdot and said boundary identified in said b1) step; and c2) monitoring said horizontal distance information to determine if a boundary between halftone dot cells has been crossed.

6. The method of claim 1 wherein said d) step comprises the substep of:

d1) upon a determination in said c) step that said next adjacent microdot is outside the given halftone dot cell, applying a predetermined transformation to a corresponding address of a previous microdot to obtain a corresponding address of said next adjacent microdot.

7. In a digital halftone system comprising an electronic memory device and a processor, wherein images are represented by a matrix of microdots located on an orthogonal rectangular u-v coordinate grid having a u axis and a v axis, wherein said matrix of microdots is divided into a plurality of square halftone cells with the centers of the halftone cells located on an orthogonal rectangular x-y coordinate grid, the x-y grid being oriented at a reference angle, θ, to the u-v coordinate grid, a method for assigning correspondences between threshold matrix cells and microdots, comprising the steps of:

a) storing in the electronic memory device a threshold matrix including rows and columns of threshold element cells containing threshold values, each threshold element cell addressable by identifying its row and column;

b) assigning an address of an initial threshold element cell to an initial microdot of a row of microdots within a given halftone cell;

c) assigning an address of a successor threshold element cell to a next microdot in a predetermined direction along said row of microdots, wherein successive adjacent microdots within the given halftone cell are assigned in sequence, in a predetermined direction, to successive threshold element cells separated by a predetermined integer number of columns within a row of the threshold matrix; and d) determining whether said next microdot is outside the given halftone cell by monitoring a horizontal distance between said next microdot and a boundary of said halftone dot cell;

e) repeating said c) and d) steps until a determination in said d) step that said next microdot is outside the given halftone dot cell; and f) applying, upon a determination in said d) step that said next microdot is outside the given halftone cell, a predetermined transformation to a threshold matrix address assigned to a previous microdot along said row to obtain a threshold matrix address of said next microdot.

8. In a digital halftone system wherein a display displays images represented by a matrix of microdots located on an orthogonal rectangular u-v coordinate grid having a u axis and a v axis, wherein said matrix of microdots is divided into a plurality of square halftone cells with the centers of the halftone cells located on an orthogonal rectangular x-y coordinate grid, the x-y grid being oriented at a reference angle, θ, to the u-v coordinate grid, a computer-readable storage medium storing software for assigning correspondences between threshold matrix cells and microdots, said software comprising:

a) code for storing a threshold matrix including rows and columns of threshold element cells containing threshold values, each threshold element cell addressable by identifying its row and column;

b) code for assigning correspondences between microdots of a row of microdots and addresses of said threshold element cells, wherein successive adjacent microdots within a given halftone cell are assigned in sequence, in a predetermined direction, to successive threshold element cells separated by a predetermined integer number of columns within a row of the threshold matrix;

c) code for determining, whether a next adjacent microdot in the row is outside the given halftone cell;

d) code for upon a determination by said c) code that said next adjacent microdot in the row is outside the given halftone cell, computing an alignment between said threshold matrix and a next halftone cell containing said next adjacent microdot; and e) code for assigning a threshold element cell to said next adjacent microdot responsive to said alignment.

9. The product of claim 8 wherein said c) code comprises:

c1) code for updating first horizontal distance information stored in the electronic memory device and indicating a horizontal distance between said next adjacent microdot and a rising boundary between halftone dot cells that is nearest in the predetermined direction;

c2) code for updating second horizontal distance information stored in an electronic memory device and indicating a horizontal distance between said next adjacent microdot and a falling boundary between halftone dot cells that is nearest in the predetermined direction; and c3) code for monitoring said first horizontal distance information and said second horizontal distance information to determine if a boundary between halftone dot cells has been crossed.

10. The product of claim 9 wherein said C1) code and said C2) code perform integer calculations.

11. The product of claim 8 wherein said b) code comprises:

b2) code for identifying a boundary between halftone 4 dot cells that is nearest along said row in said predetermined direction.

12. The product of claim 11 wherein said c) code comprises:

c1) code for updating horizontal distance information stored in on electronic memory device and indicating a horizontal distance between said next adjacent microdot and said boundary identified by said b1) code; and c2) code for monitoring said horizontal distance information to determine if a boundary between halftone dot cells has been crossed.

13. The product of claim 8 wherein said d) code comprises:

d1) code for upon a determination by said c) code that said next adjacent microdot is outside the given halftone dot cell, applying a predetermined transformation to a corresponding address of a previous microdot to obtain a corresponding address of said next adjacent microdot.

14. In a digital halftone system comprising an electronic memory device and a processor, wherein a display displays images represented by a matrix of microdots located on an orthogonal rectangular u-v coordinate grid having a u axis and a v axis, wherein said matrix of microdots is divided into a plurality of square halftone cells with the centers of the halftone cells located on an orthogonal rectangular x-y coordinate grid, the x-y grid being oriented at a reference angle, θ, to the u-v coordinate grid, a computer-readable storage medium storing software for assigning correspondences between threshold matrix cells and microdots, said software comprising:

code for storing in the electronic memory device a threshold matrix including rows and columns of threshold element cells containing threshold values, each threshold element cell addressable by identifying its row and column;

code for assigning an address of an initial threshold element cell to an initial microdot of a row of microdots within a given halftone cell;

code for assigning an address of a successor threshold element cell to a next microdot in a predetermined direction along said row of microdots, wherein successive adjacent microdots within the given halftone cell are assigned in sequence, in a predetermined direction, to successive threshold element cells separated by a predetermined integer number of columns within a row of the threshold matrix;

code for determining whether said next microdot is outside the given halftone cell by monitoring a horizontal distance between said next microdot and a boundary of said halftone dot cell;

code for repeatedly invoking said successor threshold element cell assigning code and said determining code until a determination by said determining code that said next microdot is outside the given halftone dot cell; and code for applying, upon a determination by said determining code that said next microdot is outside the given halftone cell, a predetermined transformation to a threshold matrix address assigned to a previous microdot along said row to obtain a threshold matrix address of said next microdot;

a computer-readable storage medium for storing the codes.

15. A digital halftone system, for use with a display wherein images are represented by a matrix of microdots located on an orthogonal rectangular u-v coordinate grid having a u axis and a v axis, wherein said matrix of microdots is divided into a plurality of square halftone cells with the centers of the halftone cells located on an orthogonal rectangular x-y coordinate grid, the x-y grid being oriented at a reference angle, $\theta$, to the u-v coordinate grid, said digital halftone system comprising:

a processor;

a computer-readable storage medium storing software to be executed by said processor, said software comprising:

code for storing a threshold matrix including rows and columns of threshold element cells containing threshold values, each threshold element cell addressable by identifying its row and column;

code for assigning correspondences between microdots of a row of microdots and addresses of said threshold element cells, wherein successive adjacent microdots within a given halftone cell are assigned in sequence, in a predetermined direction, to successive threshold element cells separated by a predetermined integer number of columns within a row of the threshold matrix;

code for determining whether a next adjacent microdot in the row is outside the given halftone cell;

code for, upon a determination that said next adjacent microdot in the row is outside the given halftone cell, computing an alignment between said threshold matrix and a next halftone cell containing said next adjacent microdot; and code for assigning a threshold element cell to said next adjacent microdot responsive to said alignment.

* * * * *